US008224716B2

(12) United States Patent
Walker et al.

(10) Patent No.: US 8,224,716 B2
(45) Date of Patent: Jul. 17, 2012

(54) METHODS AND SYSTEMS FOR FACILITATING THE PROVISION OF OPINIONS TO A SHOPPER FROM A PANEL OF PEERS

(75) Inventors: Jay S. Walker, Ridgefield, CT (US); Wen Y. Lin, New York, NY (US); Russell P. Sammon, Pacifica, CA (US); Norman C. Gilman, New York, NY (US); Geoffrey M. Gelman, Stamford, CT (US); Dean P. Alderucci, Westport, CT (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 12/431,470

(22) Filed: Apr. 28, 2009
(Under 37 CFR 1.47)

(65) Prior Publication Data

US 2009/0228342 A1 Sep. 10, 2009

Related U.S. Application Data

(63) Continuation of application No. 10/864,834, filed on Jun. 9, 2004, now Pat. No. 7,526,440, which is a continuation-in-part of application No. 09/602,948, filed on Jun. 26, 2000, now abandoned.

(60) Provisional application No. 60/210,946, filed on Jun. 12, 2000.

(51) Int. Cl.
*G06F 17/30* (2006.01)

(52) U.S. Cl. ............................................ 705/27; 705/26

(58) Field of Classification Search ..................... 705/26, 705/27, 27.1
See application file for complete search history.

(56) References Cited

U.S. PATENT DOCUMENTS

| 4,870,579 | A | 9/1989 | Hey ............................... 364/419 |
| 4,996,642 | A | 2/1991 | Hey ............................... 364/419 |
| 5,227,874 | A | 7/1993 | Von Kohorn ..................... 358/84 |
| 5,583,763 | A | 12/1996 | Atcheson et al. .......... 364/551.01 |
| 5,690,497 | A | 11/1997 | Clark et al. ..................... 434/322 |
| 5,724,522 | A | * 3/1998 | Kagami et al. ............. 705/26.44 |
| 5,790,426 | A | 8/1998 | Robinson ....................... 364/554 |
| 5,832,457 | A | 11/1998 | O'Brien et al. .................. 705/14 |
| 5,913,204 | A | 6/1999 | Kelly ............................. 705/500 |
| 5,918,014 | A | 6/1999 | Robinson ................. 395/200.49 |
| 5,930,769 | A | 7/1999 | Rose ............................... 705/27 |
| 6,041,311 | A | 3/2000 | Chislenko et al. .............. 705/27 |
| 6,049,777 | A | 4/2000 | Sheena et al. ................... 705/10 |
| 6,064,980 | A | 5/2000 | Jacobi et al. .................... 705/26 |
| 6,134,548 | A | 10/2000 | Gottsman et al. ................. 707/5 |
| 6,233,564 | B1 | * 5/2001 | Schulze, Jr. ................ 705/14.19 |
| 6,295,551 | B1 | 9/2001 | Roberts et al. ................. 709/205 |
| 6,307,568 | B1 | * 10/2001 | Rom ............................. 345/629 |

(Continued)

OTHER PUBLICATIONS

Walker, Leslie, "An Internet dress address", The Washington Post, Jul. 1, 1999.*

(Continued)

*Primary Examiner* — Mark Fadok
(74) *Attorney, Agent, or Firm* — Baker Botts L.L.P.

(57) ABSTRACT

In accordance with one or more embodiments, a system determines an image, selects a panel of participants, and outputs the image to each of the participants of the panel of participants. Responses may be collected from the participants and an indication of the results may be output to a shopper.

20 Claims, 21 Drawing Sheets

U.S. PATENT DOCUMENTS

| | | | |
|---|---|---|---|
| 6,310,627 B1 | 10/2001 | Sakaguchi | |
| 6,353,892 B2 | 3/2002 | Schreiber et al. | 726/26 |
| 6,754,635 B1 * | 6/2004 | Hamlin et al. | 705/7.32 |
| 6,826,540 B1 * | 11/2004 | Plantec et al. | 705/7.32 |
| 6,901,379 B1 * | 5/2005 | Balter et al. | 705/27 |
| 6,963,848 B1 | 11/2005 | Brinkerhoff | 705/10 |
| 7,062,454 B1 * | 6/2006 | Giannini et al. | 705/26.81 |
| 7,085,820 B1 | 8/2006 | Nickerson et al. | 709/219 |
| 7,149,665 B2 | 12/2006 | Feld et al. | 703/2 |
| 7,219,072 B1 | 5/2007 | Sundaresan | 705/26 |
| 7,251,607 B1 | 7/2007 | Veschi | 705/1 |
| 2001/0013009 A1 | 8/2001 | Greening et al. | 705/10 |
| 2001/0025309 A1 | 9/2001 | Macleod Beck et al. | 709/223 |
| 2001/0026272 A1 | 10/2001 | Feld et al. | 345/419 |
| 2002/0002595 A1 | 1/2002 | Blumenau | 709/218 |
| 2002/0007303 A1 * | 1/2002 | Brookler et al. | 705/10 |
| 2002/0046078 A1 | 4/2002 | Mundell et al. | 705/10 |
| 2005/0027612 A1 | 2/2005 | Walker et al. | 705/26 |

OTHER PUBLICATIONS

PR Newswire, "Delta Galil and Yossi Vardi Invest in virtual dressing room technology", Mar. 7, 2000.*

Journal Record, "From victim to entrepreneur", Jan. 18, 2000.*

Field, Chris, "Mentally dress yourself", The Times, Jun. 23, 1999.*

"C2B Signs Exclusive Deal With Consumers Digest to Bring Complete Product Comparisons to Its Online-Shopping Platform; Also Signs Deals With Deja News and Delphi Forums to Bring Community Information to Consumers", PR Newswire, Section: Financial News, Aug. 26, 1998.

Bickely, Rah, "Unwired Businesses May Come Unglued." The News and Observer, Nov. 13, 1998, Section: Business, p. D1.

Webline, "Our Customers", an article about Ciscos part in Lands end personal shopper, 9 pages, 1999.

"iTurf's DiscountDomain.com Gets a New Look; Subscription-Based Discount Site Expands Products and Services in Time for Holiday Rush", Business Wire, Nov. 9, 1999.

Press Release: "Another Success for Public Technologies Multimedia Inc.: My Virtual Model in 3-d on the galeries lafayette web site", (http://www.galerieslafayette.com), Dec. 8, 1999.

Business Wire, "webEx and mall.com launch new web-based shop with a friend meeting service; webex previews new shared shopping experience on leading e-commerce site", Dec. 16, 1999.

"CornerHardware.com Partners With ShopTok to Offer Collaborative Online Support for Home Improvement Customers", Shoptok, (http://www.shoptok.com), Feb. 29, 2000.

Dougherty, Lynn, "Adding the human factor", 3 pages, Mar. 2000.

Rice, Melinda, "Sites Encourage Shoppers to Bring a Friend Along." The Dallas Morning News, Section: Personal Technology; p. 4F, Personal Shopper, Mar. 2, 2000.

Press Release: "The Latest Innovation at Public Technologies Multimedia Inc.: My Virtual now offers lingerie at galeries lafayette", (http://www.galerieslafayette.com), Mar. 13, 2000.

My Virtual Model.com, Press release, "My Virtual model now offers lingerie at galeries lafayette", Mar. 13, 2000.

"WebLine Communications: Our Customers", (http://www.webline.com/cusiomers/customers.htm), download date: May 10, 2000.

Application to Feld et al., U.S. Appl. No. 09/541,260, "System and Method for virtual shopping of wear articles", Apr. 3, 2000.

Office Action for U.S. Appl. No. 09/602,948, in the name of Walker et al., entitled, "Shopper Information System with Peer Input", dated mailed Jan. 30, 2004.

* cited by examiner

| CUSTOMER IDENTIFIER 402 | CUSTOMER NAME 404 | ADDRESS 406 | E-MAIL ADDRESS 408 | CREDIT CARD NUMBER 410 | IMAGE IDENTIFIER 412 |
|---|---|---|---|---|---|
| C123456 | ADAMS, IRENE | 123 MAIN STREET ANYTOWN, CA 91234 | IADAMS@ISP.COM | 1111-2222-3333-4444 | I234567 |
| C234567 | JONES, IRMA | 456 OAK STREET LOW RIVER, NE 63124 | IJONES@ISP.COM | 2222-3333-4444-5555 | I345678 |
| C356890 | SMITH, INEZ | 789 SPRUCE STREET HUB, NJ 06363 | ISMITH@ISP.COM | 3333-4444-5555-6666 | --- |

FIG. 4

| CUSTOMER IDENTIFIER 502 | PARTICIPANT IDENTIFIER 504 | PARTICIPANT NAME 506 | E-MAIL ADDRESS 508 | RATING 510 |
|---|---|---|---|---|
| --- | P268591 | BROWN, BRENDA | BBROWN@ISP.COM | 2 |
| C234567 | --- | JONES, IRMA | IJONES@ISP.COM | 3 |
| --- | P367123 | PIKE, BERNICE | BPIKE@ISP.COM | 5 |
| --- | P457987 | SLATER, BONNIE | BSLATER@ISP.COM | 1 |

FIG. 5

| CUSTOMER IDENTIFIER 602 | PARTICIPANT IDENTIFIER 604 | AGE 606 | GENDER 608 | INCOME LEVEL 610 | SOCIAL ATTITUDES 612 |
|---|---|---|---|---|---|
| C123456 | -- | 28 | F | 50-75K | PARTY ANIMAL |
| C234567 | -- | 58 | F | OVER 100K | BUTTONED DOWN |
| C356890 | -- | 22 | F | 25-50K | SHY |
| -- | P268591 | 36 | F | 50-75K | VAMP |
| -- | P367123 | 33 | F | 25-50K | BUTTONED DOWN |
| -- | P457987 | 44 | F | 75-100K | YUPPIE |

FIG. 6

| COMBINED IMAGE IDENTIFIER 802 | CUSTOMER IDENTIFIER 804 | REQUEST IDENTIFIER 806 | REQUEST CATEGORY 808 | PANEL SIZE 810 | PANEL COMPOSITION 812 |
|---|---|---|---|---|---|
| I456789 | C680246 | R579123 | YES/NO | 100 | HIGH SCHOOL; VAMP |
| I567890 | C802468 | R139751 | RANGE | 50 | BUTTONED DOWN; 40-SOMETHING |
| I678901 | C791357 | R457812 | OPEN-ENDED | 20 | YUPPIE; 30-SOMETHING |
| I789012 | C913579 | R635798 | YES/NO/MAYBE OPEN-ENDED | 50 | VAMP; LATE 30S |
| I890123 | C135791 | R356987 | RANGE | 100 | EVERYONE |

FIG. 8

| RESPONSE IDENTIFIER 902 | RESPONSE OUTCOME 904 | RESPONSE TEXT 906 | REQUEST IDENTIFIER 908 | PARTICIPANT IDENTIFIER 910 |
|---|---|---|---|---|
| RS975321 | YES | -- | R457812 | C447192 |
| RS864785 | YES | -- | R457812 | C137263 |
| RS548591 | YES | -- | R635798 | P325863 |
| RS228957 | NO | -- | R635798 | P992543 |
| RS191366 | MAYBE | I LIKE THE CUT... BUT MAYBE THE COLOR SHOULD BE BRIGHTER | R356987 | P654538 |

FIG. 9

| REQUEST IDENTIFIER 1002 | ACCUMULATED OUTCOMES 1004 | PARTICIPANT IDENTIFIERS 1006 | OPEN-ENDED RESPONSES 1008 | OFFER IDENTIFIER 1010 | OFFER DESCRIPTION 1012 |
|---|---|---|---|---|---|
| R467931 | 75% YES, 20% MAYBE, 59% NO | P48379; P56937; C125971;... | I LIKE THE COLOR BUT THE SHOULDERS ARE TOO BIG, IN MY OPINION... | --- | --- |
| R397530 | 55% YES; 45% NO | P339017; C530246; ... | --- | 1347 | $10 OFF |

FIG. 10

THUMBS UP! YOU LOOK GREAT!
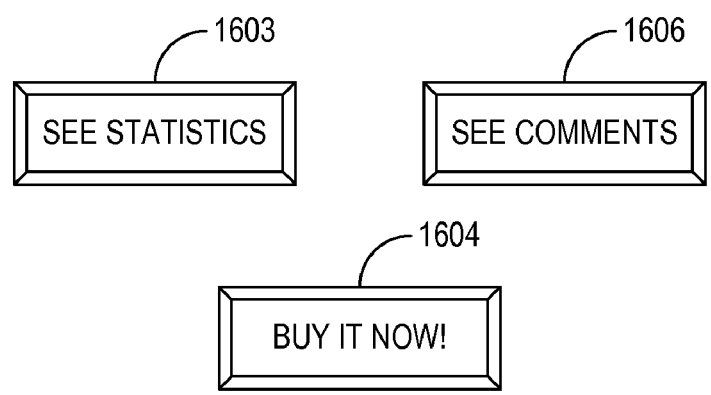
FIG. 16

METHODS AND SYSTEMS FOR FACILITATING THE PROVISION OF OPINIONS TO A SHOPPER FROM A PANEL OF PEERS

CROSS-REFERENCE TO RELATED APPLICATIONS

This application is a continuation of U.S. patent application Ser. No. 10/864,834, filed Jun. 9, 2004 and now issued as U.S. Pat. No. 7,526,440 on Apr. 28, 2009, entitled METHODS AND SYSTEMS FOR FACILITATING THE PROVISION OF OPINIONS TO A SHOPPER FROM A PANEL OF PEERS, which is a continuation-in-part of U.S. patent application Ser. No. 09/602,948, filed Jun. 26, 2000 and now abandoned entitled SHOPPER INFORMATION SYSTEM WITH PEER INPUT, which claims the benefit of U.S. Provisional Application No. 60/210,946, filed Jun. 12, 2000.

This application is also related to U.S. patent application Ser. No. 11/751,999, filed May 22, 2007 entitled METHOD AND SYSTEMS FOR FACILITATING THE PROVISION OF OPINIONS TO A SHOPPER FROM A PANEL OF PEERS.

The content of each of these applications is incorporated herein by reference.

BACKGROUND

While some people hate shopping, or at least profess to hate it, others enjoy shopping and consider shopping to be one of their favorite leisure activities. For some, one of the most enjoyable parts of shopping is trying on garments and observing how the shopper appears in the garment that is tried on. Shoppers also may derive entertainment from observing fellow shoppers as the fellow shoppers are trying on garments. It can also be an enjoyable part of the shopping experience to exchange comments and advice with other shoppers regarding garments that are being tried on.

In short, shopping can be a social experience. Indeed, family members and/or friends often go shopping together. One of the advantages (or in some cases, disadvantages) of shopping with friends or family is the opportunity to receive comments from friends and family on garments that one is trying on and/or considering purchasing. For some shoppers, comments and approval from friends, family members or fellow shoppers are an essential part of the purchasing decision process in that only with such comments and approval is the shopper able to overcome the anxiety which may be involved in deciding whether to purchase an item.

The on-line shopping experience is very different from the in-store shopping experience. Although on-line shopping can be attractive for many reasons, including especially convenience, it lacks the richness of sensory input that is available in a retail store. It particularly lacks the opportunity to try on garments and to receive input from other shoppers, including those whom one has accompanied to the store. It also lacks the psychological encouragement that many shoppers need in order to reach a decision to buy a garment.

Attempts have been made to try to duplicate some of the social and sensory elements of in-store shopping, in an on-line environment, subject to the inherent limitations of such an environment.

For example, the well-known catalog merchant Lands' End has provided a "Shop with a friend" feature on its retail website (www.landsend.com). This feature is described in an article written by Melinda Rice which appeared in the Mar. 2, 2000 edition of the Dallas Morning News and was entitled "Sites Encourage Shoppers to Bring a Friend Along". As described in this article, the "Shop with a friend" feature is limited to linking two users together. Before the joint shopping experience, the two shoppers each select a password and agree upon a time to meet at the Lands' End website. At the appointed time, each user clicks on an icon for the feature. Based on the password, the browsers of the two users are linked and the users are allowed to "shop" together, by sharing the same web pages while talking on the phone or chatting on-line.

The Lands' End web site offers another feature, referred to therein as "Your Personal Model". This feature allows a user to define a "3-D model" for the shopper's body based on inputs provided by the user, such as body measurements. When a garment is selected for a "virtual try-on", an image of the garment is combined with an image based on the virtual model to provide a combined image that represents to some extent how the user might appear while wearing the garment. Because of the limited number of options available for inputting information, the virtual models bear, in general, only a small degree of resemblance to an actual image of the user.

The present inventors have recognized the desirability of increasing the opportunities to interact with others and to receive fashion advice on-line. The present inventors have further recognized that there are opportunities to enhance the in-store shopping experience by providing Internet-based features.

BRIEF DESCRIPTION OF THE DRAWINGS

FIG. 4 is a tabular representation of a customer database that is shown in FIG. 3;

FIG. 5 is a tabular representation of a participant database that is shown in FIG. 3;

FIG. 6 is a tabular representation of a profile database that is shown in FIG. 3;

FIG. 8 is a tabular representation of a request database that is shown in FIG. 3;

FIG. 9 is a tabular representation of a response database that is shown in FIG. 3;

FIG. 10 is a tabular representation of a feedback database that is shown in FIG. 3;

FIG. 16 shows another screen display for providing feedback to a shopper based on responses from a panel of participants, in accordance with one embodiment of the invention;

DETAILED DESCRIPTION

Figure 1:
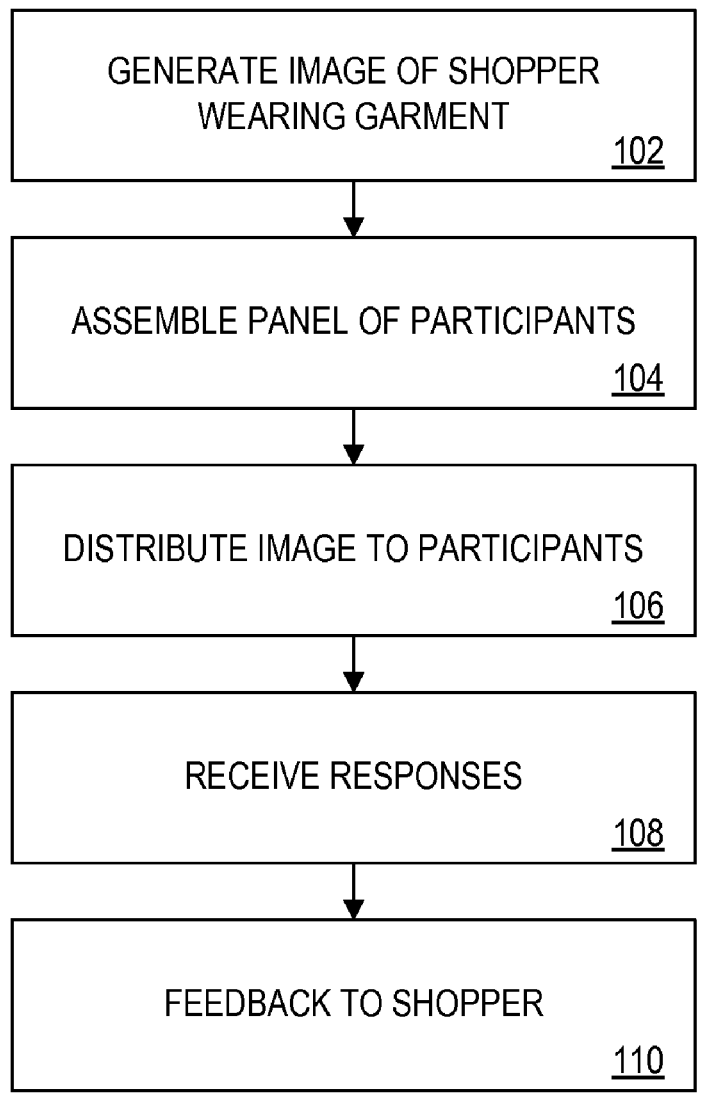
FIG. 1 is a flow chart that provides an overview of a method provided in accordance with one embodiment of the invention.

According to one or more embodiments, a method comprises receiving, from a shopper, a request for opinions regarding a garment and determining an image of the garment. The image of the garment may be, for example, also received from the shopper or retrieved from memory based on an identifier of the garment received from the shopper. The method further comprises selecting, for the shopper, a plurality of peers to provide the opinion, the peers being selected based on a characteristic associated with the shopper. The characteristic may comprise, for example, a characteristic possessed by the shopper and/or a characteristic the shopper desires at least one peer to possess. For example, if the shopper is a teenage girl, the shopper may desire opinions regarding a garment from other teenage girls who live in the same state, city or county as the shopper. The method further comprises outputting to each of the plurality of peers the request for the opinion and the image of the garment, receiving responses to the request from at least a subset of the plurality of peers, and outputting, to the shopper, an indication of the opinions of the peers regarding the garment, the opinions of the peers being determined based on the received responses. Outputting the indication of the opinions may comprise, for example, outputting a percentage of the peers who provided a positive response to the garment (e.g., "buy it" or "thumbs up") and a percentage of the peers who provided a negative response to the garment (e.g., "don't buy it" or "thumbs down"). The percentages may be determined, for example, based only on the peers who responded to the request.

According to one or more embodiments, a method comprises receiving an image from a shopper, the image depicting a garment and selecting for the shopper, substantially at a time the image is received, a plurality of participants to whom the image is to be output. Each of the participants of the plurality of participants may be selected based on a characteristic specified by a shopper associated with the garment. The characteristic may comprise, for example, a characteristic possessed by the shopper and/or a characteristic the shopper desires at least one participant to possess. The method further comprises causing, substantially at a time the plurality of participants is selected, the image to be output to each participant of the plurality of participants by causing a cellular telephone of the participant to display the image. A request for an opinion regarding the garment may be output in association with the image. The method further comprises collecting responses to the request for a predetermined period of time from a time at which the image was output, wherein the predetermined period of time is not greater than ten minutes, and outputting an indication of the collected responses to the shopper. Collecting the responses may comprise, for example, collecting the responses until one of the following conditions occurs: (i) an end of a predetermined period of time occurs, or (ii) a minimum number of responses are received.

According to one or more embodiments, a method for operating a shopper information system includes generating an image of a shopper, distributing the image to a plurality of participants, and receiving responses to the image from the plurality of participants. One or more embodiments may further include processing the received responses, which may take the form of performing a statistical analysis of the received responses in real time. The processed responses or results of the processing may then be transmitted to the shopper.

One or more embodiments may include selecting a garment to be included in the image. Alternatively, in an in-store embodiment, the shopper may don the garment and then an image of the shopper wearing the garment may be captured. In an on-line embodiment, the image of the selected garment may be combined with an image of the shopper. The image of the shopper may have been captured photographically or may be a virtual model or the like generated based on input provided by the shopper or by another user.

One or more embodiments of the present invention may include receiving input from the shopper to define characteristics of the participants, and assembling the participants based on the received input. The assembling step may include selecting a panel of participants from a pool of participants. The responses from the participants may be provided to the shopper substantially immediately upon receiving the responses, i.e. in real time. The processing of the responses may include accumulating the responses.

One or more embodiments of the present invention may include generating a question to be distributed to the participants together with the image of the shopper. The responses may include a selection of one of two alternatives posed by the question distributed to the participants. In addition or alternatively, the responses may include a selection of one of a range of alternatives posed by the question, and/or open-ended text responses to the question.

In one or more embodiments of the present invention, a method for operating a shopper information network includes logging on to a shopping website, retrieving a shopper image that represents a shopper, selecting a garment, combining an image of the selected garment with the shopper image to form a combined image, requesting a panel of participants, defining desired characteristics of the panel of participants, defining a query, determining availability of participants who match the defined desired characteristics, transmitting the query and the combined image to participants determined to be available, receiving responses to the query from participants to whom the query and the combined image were transmitted, processing the received responses and transmitting the processed responses to the shopper.

The processing step may include calculating respective percentages for categories of the received responses, and the method may further include presenting the calculated percentages to the shopper. The calculated percentages may be presented as a pie chart or a bar chart or in some other manner. The manner of presentation of the percentages may be defined by the shopper.

One or more embodiments of the present invention may include selecting a second garment and the combined image may include an image of the second garment. Thus, the on-line shopper may virtually "try on" an outfit or ensemble of two or more garments, and may receive comments on the outfit from participants contacted through on-line communication.

According to one or more embodiments of the present invention, a method of operating a shopper information system includes capturing an image of a shopper who is wearing a garment, entering a query, defining a panel of participants, transmitting the query and the image to the panel of participants, receiving responses to the query from the participants, and presenting the responses to the shopper.

One or more embodiments may include scanning a product identifier code for the garment.

According to one or more embodiments of the present invention, a shopper information system includes a processor and a memory which is connected to the processor and stores a program, the processor being operative with the program to store an image of a shopper, distribute the image to a plurality of participants, and receive responses to the image from a plurality of participants.

According to one or more embodiments of the present invention, a shopper information kiosk includes a kiosk structure, an image device, mounted on the kiosk structure, for converting an image to digital image data, a memory for storing the digital image data, a processor connected to the memory, a communication device for connecting the processor to a data network, an input device for providing shopper input to the processor, and a display for displaying information to a shopper, the processor being programmed to control the image device to capture an image of the shopper, distribute the captured image to a plurality of participants via the communication device, and present to the shopper via the display responses to the distributed image received from the participants.

The image device may include a digital camera, and the shopper information kiosk may further include a scanner connected to the processor for entering garment information.

According to one or more embodiments of the present invention, a method for operating a shopper information system includes storing respective profiles for each participant of a pool of participants, generating an image of a shopper, receiving a request for a panel of participants, the request specifying at least one participant characteristic, selecting a panel of participants from the pool of participants based on the stored profiles and the specified at least one participant characteristic, and distributing the image of the shopper to the selected panel of participants.

The method according to one or more embodiments of the present invention may further include receiving responses to the image from the panel of participants and providing feedback to the shopper on the basis of the received responses. The step of generating the image of the shopper may occur either before or after receiving the request for the panel of participants.

In accordance with one or more embodiments of the present invention, shoppers are allowed to solicit opinions from numerous peers or others with regard to a garment that the shopper is trying on during an in-store visit or virtually trying on during on-line shopping. With the benefit of opinions from others gathered via a communication network such as the Internet, the shopper can purchase with confidence, having received reactions from a considerable number of people as to whether garment is right for the shopper. This can help the shopper to overcome the anxiety which often accompanies a purchasing decision. Since a more confident shopper tends to purchase items more quickly and more often, the system and method of the present invention is also advantageous to retailers by tending to increase sales of the retailers' products.

The following definitions shall apply in this specification and in the appended garment: includes any article of wearing apparel, including shoes, handbags, belts, hats and other accessories and jewelry.

merchant: includes retailers, manufacturers, on-line sellers or other sellers of fashion products.

panel: a group of participants who respond to a particular request for an opinion from a shopper.

participant: an individual who responds to a shopper's request for an opinion or who indicates a willingness to respond to shoppers' requests for opinions. The term "participant" shall be synonymous with the term "peer" herein.

pool: a group of participants who have registered as potential respondents to requests from shoppers.

query: includes a shopper's request for a fashion opinion; may include a specific question selected or entered by a shopper.

response: any information provided by a participant in response to a query from a shopper.

shopper: an individual who is considering the purchase of a garment or other item. The term "shopper" shall be synonymous with the term "customer" herein.

FIG. 1 illustrates a method that provides an overview of some embodiments of the present invention.

The method of FIG. 1 begins with a step 102 in which an image is generated of a shopper who is wearing a garment. The image may be generated by a camera such as a digital camera, or maybe a composite image of a virtual model or other previously-stored representation of a shopper, merged with an image of a garment shown as being worn by the virtual model or representation of the shopper.

Next, at step 104, a panel of participants is assembled. As will be seen, the participants are selected to match characteristics that are specified by the shopper. Thus, the shopper may wish to receive a fashion opinion from the shopper's peers, in which case the panel of participants is selected to match characteristics of the shopper such as age, gender, income level, preferred style and social attitudes, geographical area of residence, and so forth. Alternatively, the panel of participants may be selected based on a group defined by the shopper to be different from the shopper. For example, a female shopper may wish to know whether a garment that the shopper is trying on will appeal to men.

The selection of the participants for the panel may be based upon profile information that the participants have previously provided to indicate demographic and other information for the participants.

The assembling of the panel may be via instant messaging or like technology, executed in real time.

As participants who are qualified and willing to participate are identified, the image of the shopper wearing the garment is distributed by Internet communications to the selected participants (step 106), and the participants are asked to provide their opinions. The resulting responses are then received (step 108) and processed or otherwise manipulated into a form suitable for being provided to the shopper. The resulting processed responses, or information obtained from the responses, is then presented to the shopper as feedback (step 110).

To summarize, a shopper, while trying on a garment or considering purchase of a garment on-line, is able to solicit opinions from a potentially large number of third parties on the basis of an image of the shopper wearing the garment or a representation of the shopper wearing the garment. Responses from the participants are solicited and received in real time so that the shopper can make an informed judgement as to the suitability of the garment for the shopper.

Figure 2:
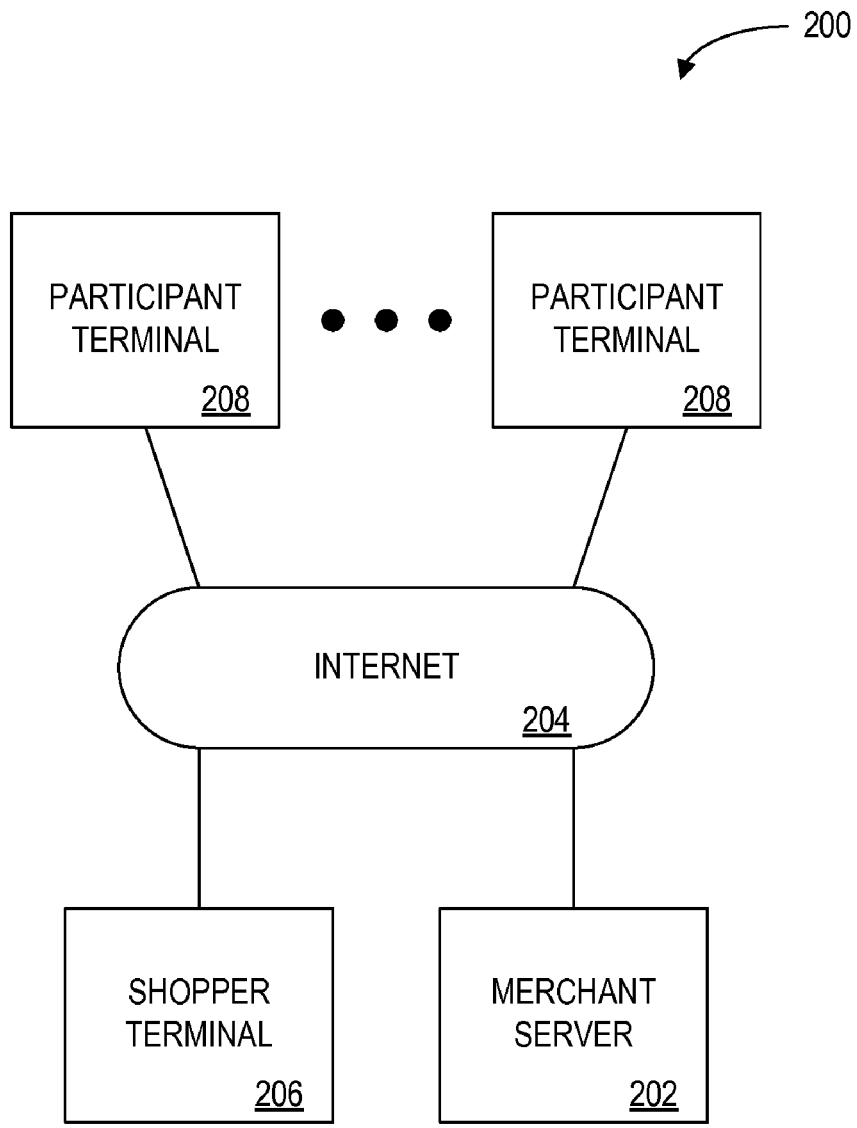
FIG. 2 is a block diagram of a system provided in accordance with one embodiment of the invention.

FIG. 2 is a block diagram that illustrates a system for providing an on-line environment in which the present invention may be applied. In FIG. 2, reference numeral 200 generally indicates the system of this aspect of the invention. The system 200 includes a merchant server 202 connected via Internet 204 to a shopper terminal 206 and participant terminals 208.

All of the hardware making up the system 200 may be conventional, programmed to carry out methods of the present invention. Thus the merchant server 202 may be constituted by one or more conventional server computers (e.g., of the type employed for retail website hosting applications). The shopper terminal 206 and the participant terminals 208 may be conventional personal computers or other devices used to interact with web servers via the Internet. A shopper terminal 206 and/or a participant terminal 208 may each comprise, for example, one or more of (i) a personal computer, (ii) a laptop computer, (iii) a handheld computer such as a cellular telephone, a land-line telephone, a pager, a personal digital assistant and/or a digital camera, (iv) a kiosk, (v) an automated teller machine, (vi) a gaming device, (vii) a game console, and/or (viii) a vending machine.

According to some embodiments of the present invention, a shopper who uses a shopper terminal 206 receives opinions from a number (e.g., three, five, ten, or dozens or even hundreds) of participants utilizing participant terminals 208, of which only two are explicitly shown in FIG. 2.

It should be understood that a single merchant server 202 may be operative to permit solicitation of fashion opinions from plural shopper terminals at a given time, although only one shopper terminal 206 is shown in FIG. 2. It should also be understood that, although only one shopper terminal 206 is shown in the drawing, the merchant server 202 may be operative to serve a plurality of shopper terminals 206.

It should be further be understood that the merchant server 202 may comprise one or more servers working together. In embodiments in which more than one server comprises merchant server 202, the more than one servers may be located in different locations and may communicate via a communication network. The merchant server 202 may refer to any device that may communicate with one or more shopper terminals 206, one or more participant terminals 208, one or more third-party servers, one or more remote controllers, and/or other network nodes, and may be capable of relaying communications to and from each.

It should further be understood that, in one or more embodiments, an entity distinct from a merchant from which the shopper is considering a purchase may facilitate aspects of the present invention. For example, Applicants envision a system operated by an entity distinct from a merchant (e.g., a cellular telephone service provider, a Internet Service Provider, or another entity). This entity may receive requests for opinions from shoppers, select participants for the shopper, transmit a request for an opinion to the participants on behalf of the shopper, collect and/or analyze the responses and provide an indication of the responses to the shopper. Thus, in some embodiments, the merchant server 202 may comprise a server operated by such an entity rather than by a merchant. In other embodiments, the system 200 may include a third party server that is operable to communicate with a plurality of merchant servers, each merchant server being operated by a merchant, and with a plurality of participant terminals 208. In yet other embodiments, the system 200 may comprise a third party server that is operable to communicate directly with a plurality of shopper terminals 206 and a plurality of participant terminals 208.

For example, Applicants envision one implementation of embodiments of the present invention wherein a shopper uses a shopper terminal 206 comprising a cellular telephone equipped with a camera. The shopper may use the camera to capture an image of a garment the shopper is considering purchasing. The shopper may transmit the image of the garment to the third party server. The third party server may select a plurality of participants and transmit the image to the cellular telephones of the plurality of participants (e.g., using cellular telephone numbers stored in association with each selected participant in a database of participants registered with the third party server). The participants may submit opinions to the third party server (e.g., "worth buying", "not worth buying"). The third party server may then transmit an indication of the opinions to the shopper's cellular telephone (e.g., "76% say 'Buy It' and 24% say "Don't Buy It"). In such an embodiment, the merchant at which the shopper is considering purchasing the garment may not be involved in the process of soliciting opinions regarding the garment for the shopper. In one or more embodiments, the system of the present invention utilizes a 3G network to transmit information to and from cellular telephones.

Figure 3:
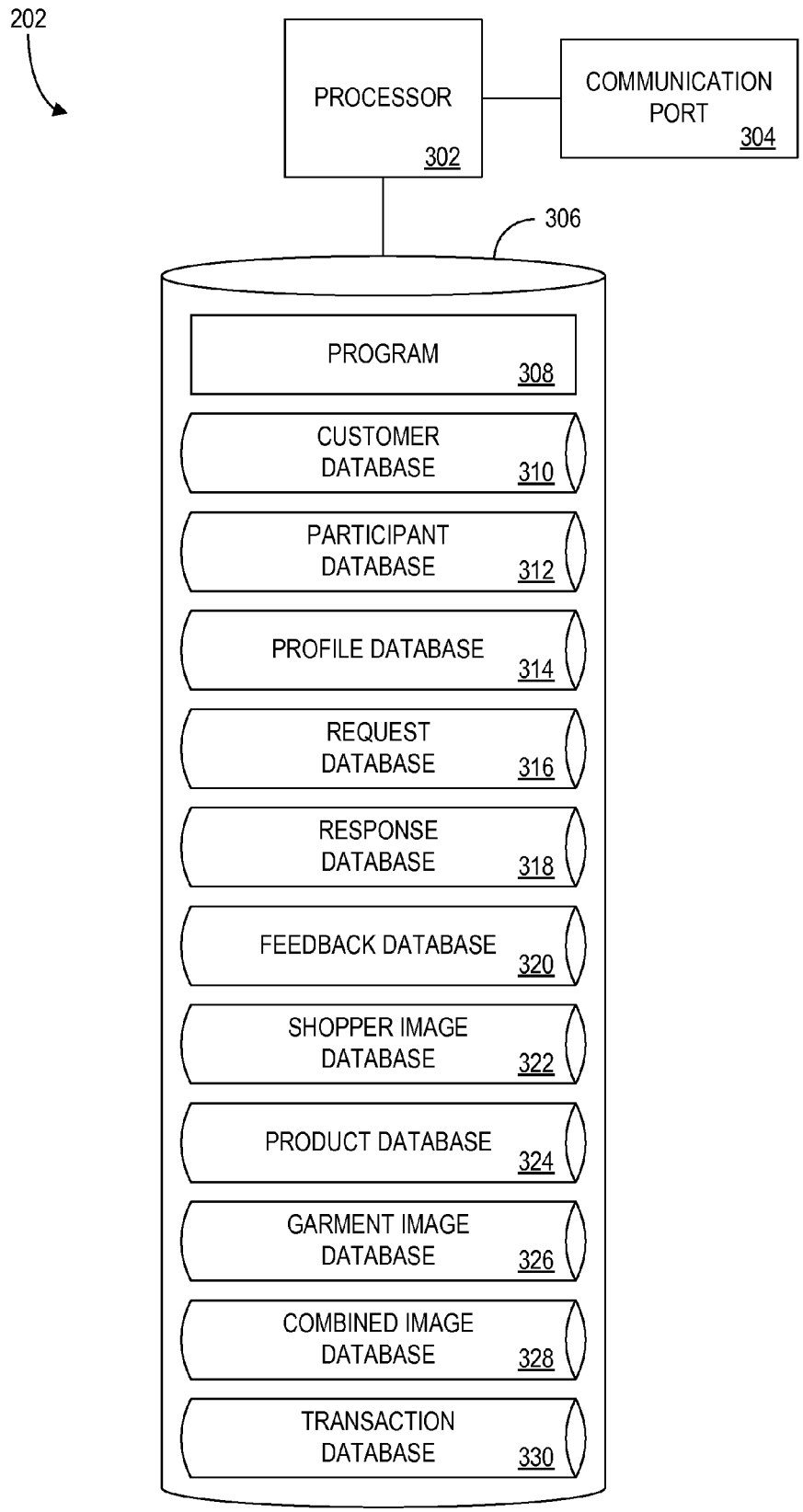
FIG. 3 is a block diagram representation of a merchant server that is part of the system of FIG. 2.

FIG. 3 is a simplified block diagram representation of the merchant server 202. The merchant server 202 includes a CPU or processor 302, one or more communication ports 304 and a mass storage device 306. As noted before, all hardware components of the merchant server 202 may be conventional. To simplify the drawing, additional conventional components of the merchant server 202, such as embedded and working memory, a clock module, data buses and so forth, are omitted from the drawing.

The processor 302 generally controls the functions of the merchant server 202 and is in communication with the communication port 304 and the mass storage device 306. The communication port 304 may be conventional circuitry that allows the processor 302 to engage in data communication with other devices via the Internet or other communication channels. The mass storage device 306 may include one or more hard drives. Stored on the mass storage device 306 is a program 308 that controls the processor 302 in accordance with the invention. The program 308 may also include conventional program elements such as operating system software, device drivers, and communication software. The program 308 may also include program elements required for operation of the merchant server 202 as a retail shopping website. Such program elements are well known to those who are skilled in the art and need not be described further. The aspects of the program 308 related to practicing embodiments of the present invention will be described in more detail below.

Also stored by the mass storage device 306 are a customer database 310, a participant database 312, a profile database 314, a request database 316, a response database 318, a feedback database 320, a shopper image database 322, a product database 324, a garment image database 326, a combined image database 328 and a transaction database 330. It should be noted that in one or more embodiments different information, additional information, or a subset of the information illustrated in these databases may be used. Further, the information may be stored in a configuration different from that illustrated in databases 310 through 330.

Except to the extent that these databases are conventional data structures maintained in retail shopping websites, more detailed descriptions of these databases now follow.

FIG. 4 is a simplified tabular representation of the customer database 310 shown in FIG. 3. The table of FIG. 4 includes a column 402 for customer identifiers, a column 404 for customer names, a column 406 for customer addresses, a column 408 for customer e-mail addresses, a column 410 for customer credit card account numbers, and a column 412 for pointers to respective customer images in the shopper image database 322.

The entries in column 402 are identifying codes that uniquely identify each customer. The entries in columns 404-410 are self explanatory, and are items of information that are conventionally stored in customer databases of retail shopping websites. The image identifiers in column 412 are pointers to the respective images captured or generated based on customer input for each customer who wishes to avail himself or herself of the features of the present invention and for whom a corresponding image has been stored in the shopper image database 322. It will be noted that not all shoppers have elected to apply for the fashion opinion feature of the present invention and consequently some customers do not have an entry under column 412.

Although only three entries are shown in the table of FIG. 4, it is to be understood that, in a typical implementation of the invention, the customer database will contain a large number of entries, corresponding to a large number of customers. It should also be understood that the customer database may store additional items of information of the types customarily stored for retail on-line shopping applications, including information such as preferred shipping carrier and preferred mode of shipment. The customer database may also include a historical record of purchases that have been made by the customers. In embodiments where information is transmitted to and/or from a customer via a cellular telephone or other mobile device, the telephone number and/or other information required to contact the cellular telephone or other mobile device may be stored in the customer database for one or more customer records.

FIG. 5 is a simplified tabular representation of the participant database 312 shown in FIG. 3. The table of FIG. 12 includes a column 502 for customer identifiers, a column 504 for participant identifiers, a column 506 for participant names, a column 508 for participant e-mail addresses and a column 510 which contains rating information for participants. In embodiments in which participants are contacted via cellular telephones (e.g., images and/or requests for opinions are transmitted to the participants via cellular telephones on a 3G network), the participant database 312 may store cellular telephone numbers for the participants.

It is noted that participants need not be customers of the merchant who maintains the merchant server (in embodiments wherein the server is operated by a merchant). Consequently, there may be no customer identifier available for the participant. For participants who are customers, the corresponding customer identifier is entered in column 502 and no participant identifier is provided. For participants who are not customers, a participant identifier is issued to uniquely identify the participant and is entered in column 504. In one or more embodiments, participants are not employees (e.g., customer service representatives) of the merchant operating merchant server 202.

The entries under columns 506 and 508 are self-explanatory. It is noted that, although only women's names are shown in the tables of FIGS. 4 and 5, it is contemplated that men as well as women may be customers and participants. Furthermore, it is contemplated that the present invention may be implemented in websites that have only men as customers and/or as participants.

Although only four entries are shown in FIG. 5, it is contemplated that the number of entries, corresponding to a pool of potentially available participants, may be very large and may be larger than the number of customers in the customer database.

The rating information in column 510 is indicative of ratings that have been accorded to the participants to reflect the extent to which participants have participated frequently, conscientiously and/or effectively in panels responding to shoppers' queries for fashion opinions. Rating of participants will be discussed further herein below.

In embodiments where information is transmitted to and/or from a participant via a cellular telephone or other mobile device, the telephone number and/or other information required to contact the cellular telephone or other mobile device may be stored in the participant database for one or more participant records.

FIG. 6 is a simplified tabular representation of the profile database 314 shown in FIG. 3. The table of FIG. 6 includes a column 602 for customer identifiers, a column 604 for participant identifiers, a column 606 for the age of the profiled individual, a column 608 for the gender of the profiled individual, a column 610 for the income level for the profiled individual and a column 612 for the self-described social attitude of the profiled individual.

As in the table of FIG. 5, a customer identifier is provided for profiled individuals who are customers; for profiled individuals who are not customers, participant identifiers are provided. The age, gender and income level columns 606-610 are self explanatory, and are representative of the various kinds of demographic information that may be stored in the profile database. Other examples of demographic information that may be provided are type of neighborhood of residence (e.g., urban, suburban, ex-urban), and geographic region (e.g., northeast, south, midwest, west coast). In cases where the profiled individual's address is available, both the type of neighborhood and the geographic region may be derived automatically from the individual's zip code. Other kinds of demographic information that may be included, though not indicated in the drawing, are race, ethnic background, religion, marital status, and occupation.

Column 612 contains data indicative of the profiled individual's own characterization of her social attitudes. It will be seen that the designations shown in FIG. 6 include categories such as "party animal", "buttoned down", "shy", "vamp", "and "yuppie". Numerous other potential categories may be provided, including, for example, "grunge", "debutante", and "biker chick".

It is also contemplated that the profile database may include more than one column for subjective categories by which the profiled individual can characterize himself or herself. For example, there may be separate columns for personas projected by the profiled individual in work situations and in social situations, respectively.

As described above, in one or more embodiments a plurality of participants may be selected to provide an opinion to a shopper regarding a garment based on a characteristic associated with the shopper. The characteristic may comprise a characteristic possessed by the shopper and/or a characteristic the shopper desires one or more participants to possess. For example, the shopper may specify that at least one participant should be of a certain gender, income level, age and/or self-described social attitude. In another example, a participant may be selected such that the participant shares at least a predetermined number of (or a predetermined particular one or more) characteristics with the shopper requesting the opinions. For example, the merchant server 202 may be programmed to only select participants for a shopper who are within a predetermined range of the shopper's age, are of the same self-described social attitude as the shopper and live within a predetermined geographical range of the shopper.

Figure 7:
FIG. 7 shows a screen display provided in accordance with the invention for entering profile information to be stored in the profile database of FIG. 6.

FIG. 7 represents a screen display provided to customers and/or participants to permit them to enter profile information. The display of FIG. 7 includes fields 702 and 704 for entering first and last names. Field 706 is for entering the individual's e-mail address. At field 708 the individual's age is entered and check boxes at 710 allow the individual to enter his or her gender.

At 712 a pull down menu is provided to allow the individual to select his or her occupation from a number of alternative occupations included in the menu. A pull down menu provided at 714 allows the individual to select an appropriate income level. Additional pull down menus at 716 and 718 allow the individual to select subjective categories such as a social attitude category and a dressing style. Via a button 720 the individual may indicate completion of the profile information. A button 722 can be used to cancel entry of the profile information. It will be recognized that the screen display of FIG. 7 is only an example of many different alternative screen displays that may be provided for entering profile information. For example, the number and purposes of data entry fields and pull down menus may be different from those shown in FIG. 7. The types of demographic and/or subjective information to be collected may be varied in a large number of ways.

FIG. 8 is a simplified tabular representation of the request database 316 shown in FIG. 3. The table of FIG. 8 has a column 802 for combined image identifiers, a column 804 for customer identifiers, a column 806 for request identifiers, a column 808 for request category information, a column 810 for panel size information and a column 812 for panel composition information.

The entries in column 802 are pointers to images stored in the combined image database 328 shown in FIG. 3. As will be understood from subsequent discussion, the images in the database 328 are formed by combining image information representative of the shopper, such as a virtual model of the shopper, together with image information which shows a garment selected for a virtual try on by the shopper.

The customer identifiers in column 804 have previously been discussed, and uniquely identify the shopper who is submitting the corresponding request for a fashion opinion. The request identifiers in column 806 uniquely identify each request submitted by shoppers who use the feature of the present invention.

The information in column 808 characterizes each request by the nature of the feedback requested by the shopper. Among the different possible categories is simple binary feedback (e.g., yes/no or "buy it"/"don't buy it"). Other possibilities are responses in a range of responses such as, on a scale of 1 to 5, is this garment very unattractive, somewhat unattractive, average, somewhat attractive, very attractive. Another possible kind of request category solicits open-ended text responses. Another possible type of response would allow three alternatives, namely yes, no or maybe or "looks great"/"looks ok"/"looks terrible". In addition, the various types of requested feedback can be combined. For example, a request for yes/no/maybe feedback can be combined with a request for open-ended text responses.

In one embodiment, a shopper may be unable to request different types of feedback. For example, the system may be programmed to always solicit only a single type of feedback (e.g., "Buy It"/"Don't Buy It" or "Thumbs Up"/"Thumbs Down").

Column 810 records data, which indicates the size of the panel as requested by the shopper. In one or more embodiments, the shopper may request a size of the panel by specifying a number of participants to whom the image (e.g., image of a garment, image of the shopper wearing the garment, or image of a virtual model of the shopper combined with an image of a garment) is to be output. In another embodiment, the shopper may request a size of the panel by specifying a number of responses that are to be collected. In another embodiment, the shopper may request a size of a panel by specifying a relative size of a panel (e.g., small, large, huge) without specifying a particular number of participants. In such an embodiment, each relative size of the panel may be associated with a respective range of participants (e.g., three to five participants is a small panel, six to ten participants is a medium panel, eleven to twenty participants is a large panel, and over twenty participants is a huge panel) to whom the image is to be output or from whom responses are to be collected. For example, a shopper may specify that the indication of the opinions is to be output to the shopper (and, e.g., the solicitation for opinions ended) when ten responses have been received.

It should be noted that, in one or more embodiments, a shopper may specify a period of time for which responses are to be collected, in lieu of or in addition to specifying a size of a panel. For example, a shopper may specify that responses are to be collected for sixty seconds (e.g., from a time at which the request for opinions is output to participants) and the indication of opinions should thus include an indication of whatever opinions are received within the sixty seconds.

It should further be noted that, in one or more embodiments, a panel size and/or a period of time for which responses to a request for an opinion are collected may be parameters set by the system operator and not by the shopper. For example, in one embodiment, each shopper requesting an opinion is provided with an indication of whatever opinions are collected during a predetermined period of time (e.g., sixty seconds). Thus, for example, a request for opinions may be output to a predetermined number of qualified participants (e.g., participants selected based on a characteristic associated with the shopper) or to all currently available qualified participants and responses collected for the following predetermined period of time (e.g., sixty seconds). At the end of the predetermined period of time, an indication of the responses received during the predetermined period of time may be output to the shopper.

Column 812 provides information that represents the shopper's requested characteristics for the participants who will make up the panel. It should be noted that for purposes of illustration the participant characteristics are set forth in simplified form in FIG. 8. In a practical embodiment of the invention, there may be several different parameters that have been defined by the shopper to request the type of participants in which the shopper is interested.

In one or more embodiments, a shopper may pay for using the system of the present invention. For example, the shopper may pay per request submitted or on a subscription basis (e.g., a shopper may pay an extra fee to the shopper's cellular service provider in exchange for a feature wherein the shopper may request fashion opinions). In such embodiments, different fees may provide the shopper with access to more flexibility in submitting requests. For example, an increased fee may allow a shopper to increase the size of the panel, request different types of feedback, and/or select more tailored characteristics of participants to be included on a panel.

In one embodiment, a shopper may be allowed to include information in addition to the image with the request to the panel of participants. For example, an indication of the price of the garment, the designer of the garment, the material(s) of which the garment is made, an occasion to which the garment is to be worn may be included with the image and/or an additional image (e.g., an image of the garment in a different color, closer up, or at a different angle). In one embodiment, the shopper may be charged an extra fee for including information in addition to the image with the request.

FIG. 9 is a tabular representation of the response database 318 shown in FIG. 3. The table of FIG. 9 includes a column 902 for storing response identifiers, a column 904 for storing response outcomes, a column 906 for storing text portions of responses, a column 908 for storing request identifiers, and a column 910 for storing participant identifiers. The response identifiers stored in column 902 uniquely identify each of the responses received and stored in the response database. The response outcomes of column 904 are indicative of specific alternatives selected in the responses with regard to the queries that prompted the responses. Thus, in the case of a binary (yes/no) query, a "yes" or "no" portion of the response is stored in column 904. Similarly, where the query calls for a multiple-choice response or a choice within a range of responses, the corresponding selected alternative response is stored in column 904.

Where the response includes open-ended text, the text is stored in the corresponding field under column 906.

The request identifier stored in column 908 indicates the particular request which prompted the respective response. The participant identifier in column 910 identifies the participant who provided the respective response.

In one or more embodiments, a participant may be allowed to rate the opinion provided by the participant. For example, the participant may be allowed to indicate a degree of confidence, strength or certainty of the participant's opinion. For example, if the participant is voting "Buy It", the participant may be allowed to indicate a strength of the participant's opinion (e.g., on a scale of 1 to 5, with 1 being the strongest). In another embodiment, a participant may be allowed to indicate a reason for the participant's response. For example, if the participant is providing a text response, the text may indicate the reason why the participant is of the opinion indicated in the response (e.g., why the participant is of the opinion that the shopper should not purchase the garment in the image). In another example, if the participant is providing a binary "Buy It"/"Don't Buy It" response, the participant may still be allowed to indicate the reason for the response (e.g., in text format or by selecting one of a plurality of predetermined choices, such as "price", "color", "dated look", "fit", etc.).

In one or more embodiments, a shopper and participant may be allowed to communicate with one another. For example, a shopper may find a particular response (e.g., a text response) particularly intriguing and may request to communicate with the participant who provided the response. In another example, a participant may find that the participant has a variety of information to provide to the shopper (e.g., advice about what styles would be particularly flattering to the shopper) that would best be conveyed by communicating with the shopper rather than in the response to the request for an opinion. In an embodiment where a shopper and participant are allowed to communicate, one or both of the shopper and participant may be provided contact information via which the other may be contacted (e.g., telephone number or e-mail address). In such an embodiment, the shopper and participant may communicate directly with one another. In another embodiment, the shopper and participant may be allowed to communicate with one another via the merchant server 202. For example, the merchant server 202 may relay messages between the shopper and participant or the shopper and participant may communicate via a chat room maintained by the merchant server 202.

FIG. 10 is a tabular representation of the feedback database 320 shown in FIG. 3. Each entry in the table of FIG. 10 contains summary and/or other accumulated information that was obtained by receiving, accumulating and processing all responses for a particular request. The table of FIG. 10 includes a column 1002 for request identifiers; a column 1004 for data obtained by accumulating and analyzing response outcomes for the respective request, column 1006 for the participant identifiers for all of the participants who responded to the request, column 1008 for collecting all of the open ended text responses for the respective request, column 1010 for offer identifiers that identify offers that are applicable to response feedback provided for a respective request, and column 1012 which contains descriptions of applicable offers. Offers provided in connection with feedback for shoppers' requests will be discussed further below.

Although entries corresponding to feedback for only two requests are shown in the table of FIG. 10, it is to be understood that in a practical embodiment of the invention the number of entries may be much larger, corresponding to feedback stored for a large number of requests.

In one or more embodiments in which a shopper is provided with an indication of the responses received in response to the shopper's query for opinions regarding a garment in simplified form (e.g., percentage of positive opinions versus percentage of negative opinions), the shopper may be allowed to access more detailed information regarding the responses. For example, the shopper may be allowed to access any additional information provided by a participant with a response (e.g., the text of the response and/or the reasons for the opinion). For example, the shopper may be allowed to select a "more details" option on a screen of the shopper terminal 206.

The information in the feedback database 320 and/or the response database may be utilized to provide more detailed information about responses to the shopper. For example, the feedback database 320 may include the response identifier of each response used to determine the data in column 1004. The records of the responses corresponding to the response identifiers may be retrieved from the response database 318 and any additional data stored for each response in the retrieved records may be output to the shopper. Additionally, should the shopper indicate a desire to communicate with a participant who provided a particular response, the participant identifier corresponding to the response may be retrieved from the response record of the response database 318. The contact information for the participant may then be retrieved from the participant database 312 and utilized to allow the shopper to communicate with the participant. For example, the contact information may be provided to the shopper, with the participant's permission. Alternatively, a message from the shopper may be relayed to the participant using the contact information.

The shopper image database 322, the product database 324, the garment image database 326, the combined image database 328 and the transaction database 330 need not be described in detail but will now be briefly discussed.

The shopper image database 322 stores image data that is to be used to represent the shoppers' appearance during virtual "try-ons" of garments. As noted before, the data in this database may be derived from one or more photographs of the shoppers and/or may represent virtual models of the shoppers.

The product database 324 may have the same format as conventional data structures maintained for existing retail-shopping websites to store data regarding products available for on-line sale.

The garment image database 326 stores image data that represents the appearance of garments that may be virtually "tried on" and/or that are available for purchase by a shopper. The garment data is available to be combined with the shopper image data to provide a representation of the shopper "trying on" a selected garment. Additionally, the garment data is available for transmission to a participant for an opinion In one embodiment, a garment image database 326 is used to retrieve an image of a garment a shopper is considering purchasing. For example, a shopper may input a garment identifier into shopper terminal 206 and transmit the garment identifier to the merchant server 202 along with a request for opinions regarding the garment. The shopper may input the garment identifier, for example, by scanning a bar code associated with the garment using a bar code peripheral device of the shopper terminal 206. Alternatively, the shopper may input the garment identifier by typing it using a keypad of the shopper identifier. Other input devices (e.g., touch screens, microphones, etc.) would be apparent to one of ordinary skill in the art after reading the present disclosure. The merchant server 202 may maintain a database of garment images (or have access to one or more of such databases), such as garment image database 326. Each garment image in such a database may correspond to a garment identifier. Thus, once the garment identifier is received from the shopper, the image corresponding to the garment identifier may be retrieved from the database and transmitted to each selected participant. In one or more embodiments, the garment image database 326 may store additional information about a garment (e.g., designer, color, material, or other description). In one embodiment, such additional information about the garment may be included in the request for an opinion that is transmitted to a participant.

The combined image database 328 stores data corresponding to images formed by combining shopper image data with garment image data.

The transaction database 330 may resemble conventional data structures employed in connection with retail shopping websites to keep track of purchases transacted through the website. The transaction database 330 may store, for example, information about garments purchased (e.g., time of purchase, purchase total, items purchased, payment identifier). In another example, the transaction database 330 may store information about a request for opinions submitted by a shopper (e.g., time of request, price paid for request, etc.).

Operation of an on-line embodiment of the invention will now be described with reference to FIG. 11.

Figure 11:
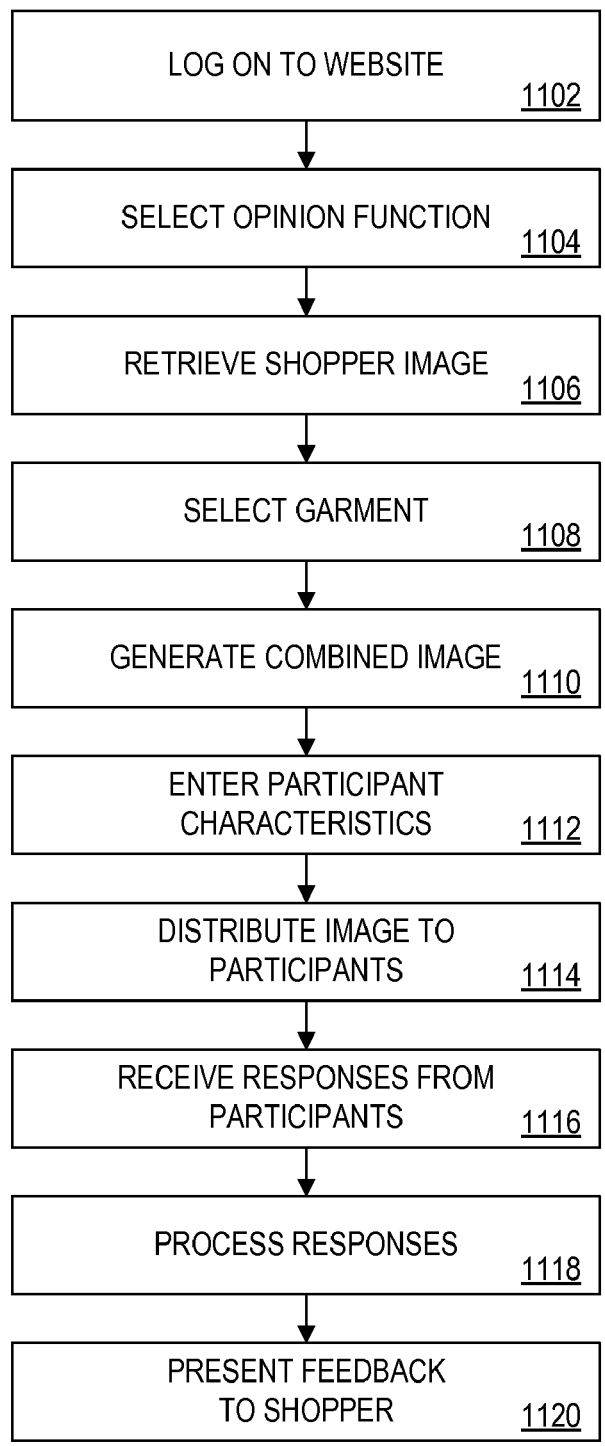
FIG. 11 is a flow chart that illustrates a method carried out using the system of FIG. 2 in accordance with one embodiment of the invention.

At step 1102 in FIG. 11, a shopper logs on to a retail shopping website. This may occur in an entirely conventional manner. Next, at step 1104, the shopper invokes a "request opinion" function provided in accordance with the invention at the retail shopping website. The selection of this function may be accomplished by such conventional techniques as clicking on a suitable link, actuating a virtual button, or selecting an item from a menu.

Then, at step 1106, an image that represents the shopper is retrieved. The image may be a virtual model that has previously been created for the shopper based on input provided by the shopper. Creation of such a virtual model may be in accordance with known techniques, such as those employed for the "Your Personal Model" feature of the Lands' End shopping website (www.landsend.com). Alternatively, or in addition, the image of the shopper may be based upon one or more photographs of the shopper. Such photographs may have been scanned in to the shopper's computer and then transmitted to the website or may be captured by a camera interfaced to the shopper's computer. As still another alternative, the shopper may have visited a retail store or service location affiliated with the shopping website to have one or more photographs taken for transmittal to the website. In addition, or alternatively, at such a retail store or service location, scanning technology such as laser scanning of the type used for Levi's custom jeans may be employed to generate a model of the shopper that very closely approximates the actual shape of the shopper's body. As still another alternative, the shopper may select (or may previously have selected) a "dummy" image of a kind that resembles the shopper's body type. The selected dummy then serves as an image of the shopper. Shoppers who wish to preserve their anonymity may be permitted to edit their images so as to obscure their faces.

At step 1108 the stopper selects one or more garments that the shopper desires to virtually "try on". It will be noted that step 1108 may be performed prior to steps 1104 and 1106. Selection of the garment may be performed in accordance with known techniques.

At step 1110 an image of the selected garment or garments is retrieved from the garment image database 326 and is combined with the shopper image retrieved at step 1106 to provide a representation of the shopper wearing the selected garment. The resulting combined image is then available for distribution to participants to obtain their opinions as to the attractiveness of the garment or garments and/or their suitability for purchase by the shopper.

Figure 12:
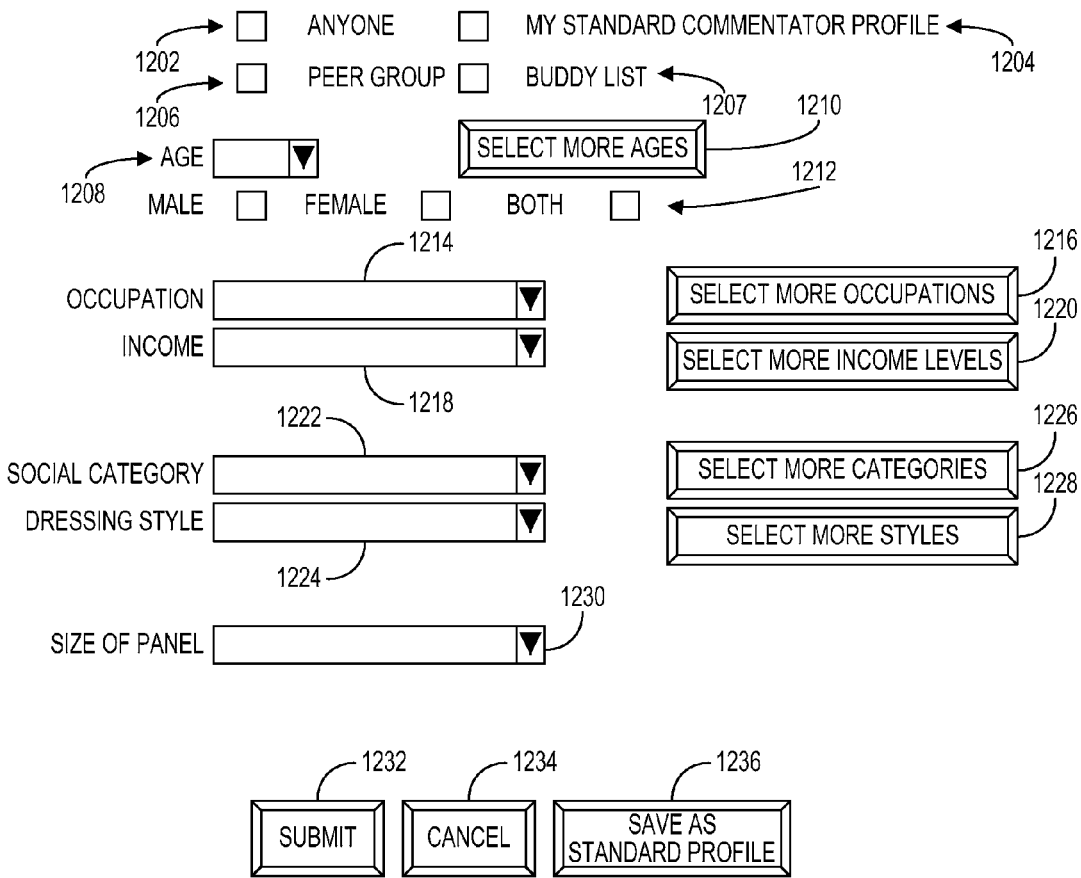
FIG. 12 shows a screen display provided in accordance with one embodiment of the invention for entering data for defining a request for feedback from a panel of participants.

At step 1112 the shopper indicates characteristics of participants from whom the shopper wishes to receive an opinion in regard to the selected garment or garments. The shopper's selection of participant characteristics may be facilitated by a screen display of the type shown in FIG. 12. In the display of FIG. 12 a checkbox 1202 may be selected if the shopper wishes to receive opinions from any available participant. If the shopper selects checkbox 1204, a previously entered definition of a participant panel is invoked.

A checkbox 1206 is available to permit the shopper to select a panel of participants made up of his or her peers. It is to be understood that a peer group participant panel would be made up of participants who have the same demographic characteristics and social attitudes and/or other profile characteristics as the shopper. The definition of the shopper's peer group may be based on a profile that the shopper has previously entered into the website, as discussed in connection with FIG. 7. It should be noted that the peer group panel definition invoked by checkbox 1206 may be the same as the standard participant panel definition invoked by checkbox 1204. That is, the shopper's "standard" participant panel definition may be the same as his or her peer group.

A checkbox indicated at 1207 permits the shopper to select a previously defined panel of specific individuals who are friends or acquaintances of the shopper.

If the shopper does not elect the all-inclusive or previously specified participant panel definitions that may be invoked by one of the checkboxes 1202-1207, the shopper may elect to define the participant panel in terms of specific characteristics by actuating other elements of the screen display of FIG. 12. For example, a pull down menu 1208 allows the shopper to specify an age category for the panel of participants. If the shopper wishes to select two or more of the age categories available from the pull down menu 1208, this may be done by actuating a button 1210 in cooperation with the pull down menu 1208.

Checkboxes provided at 1212 allow the shopper to select the gender or genders of the participants to be included in the panel.

A pull down menu provided at 1214 allows the shopper to specify the occupation of participants to be included in the panel. A button provided at 1216 allows the participant to select more than one occupation from the menu 1214.

A pull down menu provided at 1218 allows the shopper to designate an income level of participants to be included in the panel, and a button 1220 to be used in conjunction with the menu 1218 allows more than one income level to be designated. Pull down menus 1222 and 1224 may be used by the shopper to designate social categories and dressing styles of participants to be included in the panel. Buttons 1226 and 1228, respectively associated with the menus 1222 and 1224, permit the shopper to select more than one item from the respective menus.

The desired size of the panel can be defined by using the pull down menu indicated at 1230. There are trade-offs involved in selecting the size of the panel. In general, the larger the panel, the more confident the shopper may feel that he or she has received a sound opinion on the selected garment or garments. On the other hand, larger panels may take longer to assemble and to receive responses from, and, in some circumstances, a sufficient number of participants may not be available to provide a panel of the size requested by the shopper.

When the shopper is satisfied with the definition of the participant panel as input via the screen display of FIG. 12, he or she may actuate a "submit" button 1232. If the shopper wishes to revise the participant panel definition or to exit from the process of selecting a panel without going forward, then a "cancel" button 1234 may be actuated. If the shopper desires to store the panel definition defined in the screen display of FIG. 12 as a standard profile for his or her participant panels, then a button 1236 may be actuated.

It should be recognized that the layout of the screen display of FIG. 12 may be varied and that items for defining the panel may be omitted from or added to those shown in FIG. 12. For example, elements for prescribing the geographical location of participants may be added, and there may be different or additional categories of subjective or self-defined categories in addition to those represented by the menus 1222 and 1224.

The display of FIG. 12 may also include a field (not shown) in which the shopper may enter a specific query to be posed to the participants. The query might be something like, "This blouse costs $50.00; is it a good buy?" or "Do these shoulder pads look right?" Or there may be a pull down menu that allows the shopper to select from among a number of pre-stored queries. In the absence of such a query being entered or selected by the shopper, the system may pose a standard query to the participants, as will be seen in connection with FIG. 14. It is contemplated that the opportunity for the shopper to enter or select a query may be provided in a screen display that is separate from the panel definition display of FIG. 12.

It should also be noted that the definition of the participant panel represented by step 1112 in FIG. 11 may occur before one or more of the steps 1106 through 1110.

Once the combined image representing the shopper and the selected garment or garments has been generated and the participant panel has been defined, the merchant server 202 proceeds to assemble the panel and distribute the combined image to the panel of participants (step 1114).

Participants selected to receive the image are determined by comparing profiles of available members of a pool of participants with the characteristics selected by the shopper at step 1112. Participants may indicate their availability to be members of a panel in a number of different ways. For example, a participant may download a client application to the participant's terminal to support a function like the "instant messaging" function available through the AOL Internet service or to support the well-known "ICQ" function. In another embodiment, participants may log onto a suitable page of the merchant website to indicate their availability.

Figure 13:
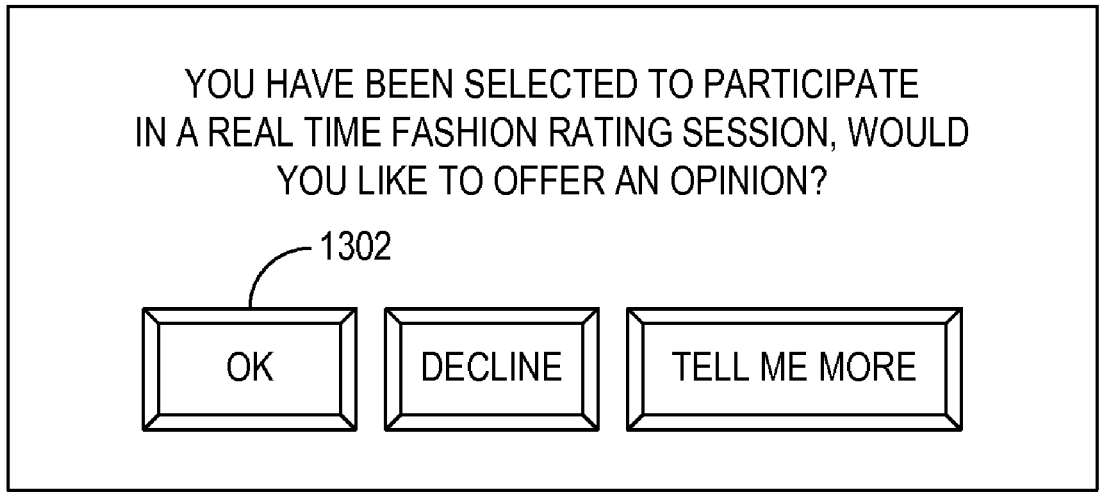
FIG. 13 shows a pop-up display provided in accordance with one embodiment of the invention, to solicit participation in a panel by a prospective participant.
Figure 14:
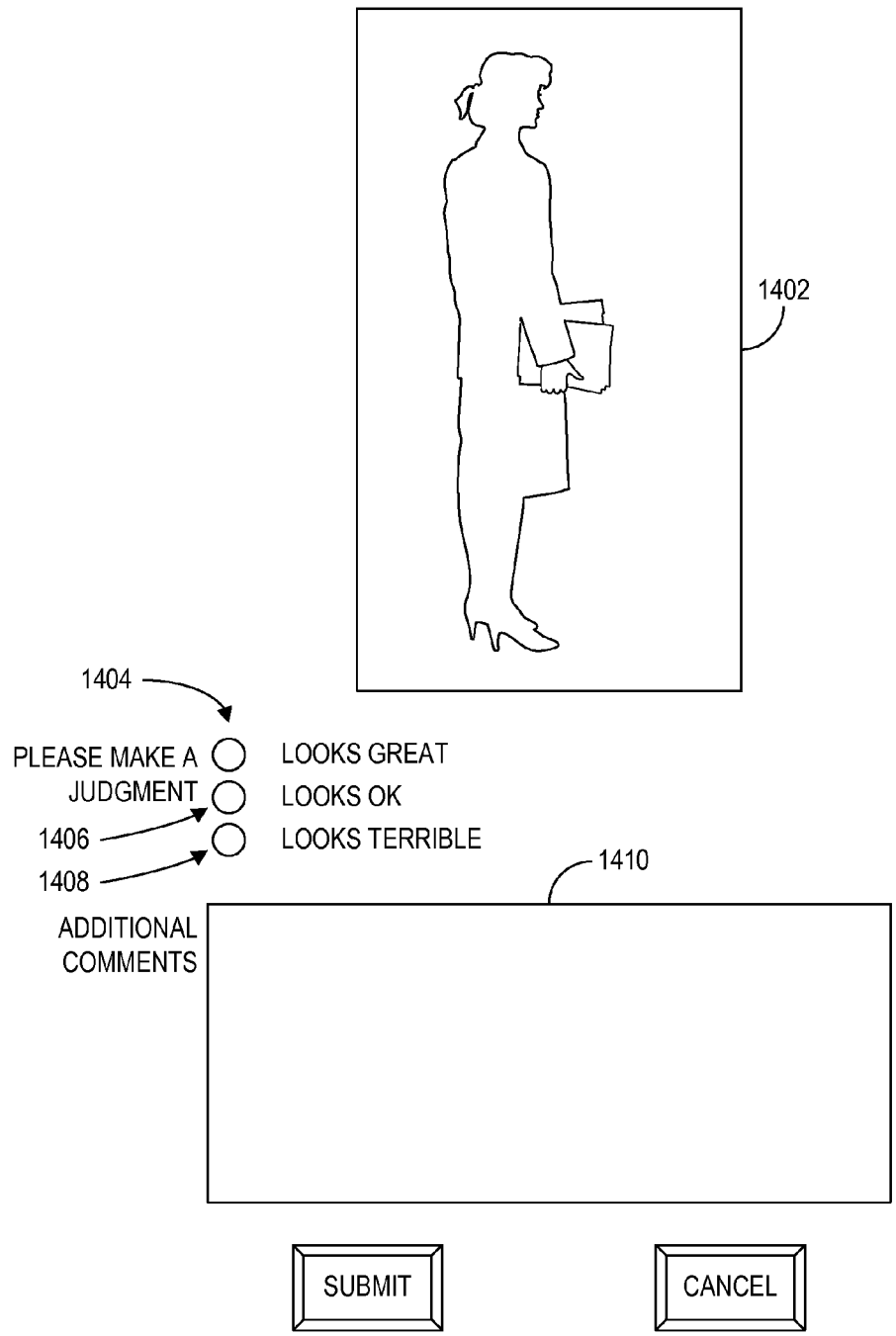
FIG. 14 shows a screen display provided in accordance with one embodiment of the invention to a participant who has indicated a willingness to participate in a panel.

Until the desired number of participants have received the image and responded to the shopper's request for feedback, the merchant website selects each available participant who matches the shopper's selected criteria as a potential participant for the panel. A message like that shown in FIG. 13 is sent to the selected participants to determine whether the available participants are, in fact, interested in participating in a panel. If the participant selects the OK button 1302 shown in FIG. 13, then a display page like that shown in FIG. 14 is sent from the merchant server to the participant's terminal. It will be noted that the display of FIG. 14 includes an image 1402 which is the combined image generated at step 1110. Also shown in FIG. 14 are checkboxes 1404, 1406 and 1408 that respectively allow the participant to register a positive, neutral or negative opinion based on the image 1402. A field 1410 is also provided to permit the participant to enter additional comments in the form of open-ended text.

Instead of the three checkboxes shown in FIG. 14, only two alternatives, i.e. positive and negative, may be provided. Also, more than three alternatives may be provided. For example, the participant may be prompted to select one of a range of five alternatives, e.g.: How does this look on a scale of 5? In this case the possible alternatives may be 5-excellent, 4-good, 3-average, 2-poor, 1-terrible.

Referring once more to FIG. 11, responses entered by participants via the display of FIG. 14, or a similar display, are received by the merchant server (step 1116) and the received responses are then processed (step 1118) by, for example, performing a statistical analysis to determine what percentage of the responses were favorable, unfavorable and neutral. Based on the processing of the responses, feedback is then provided to the shopper (step 1120) to indicate to the shopper the results of the responses from the panel of participants.

Figure 15:
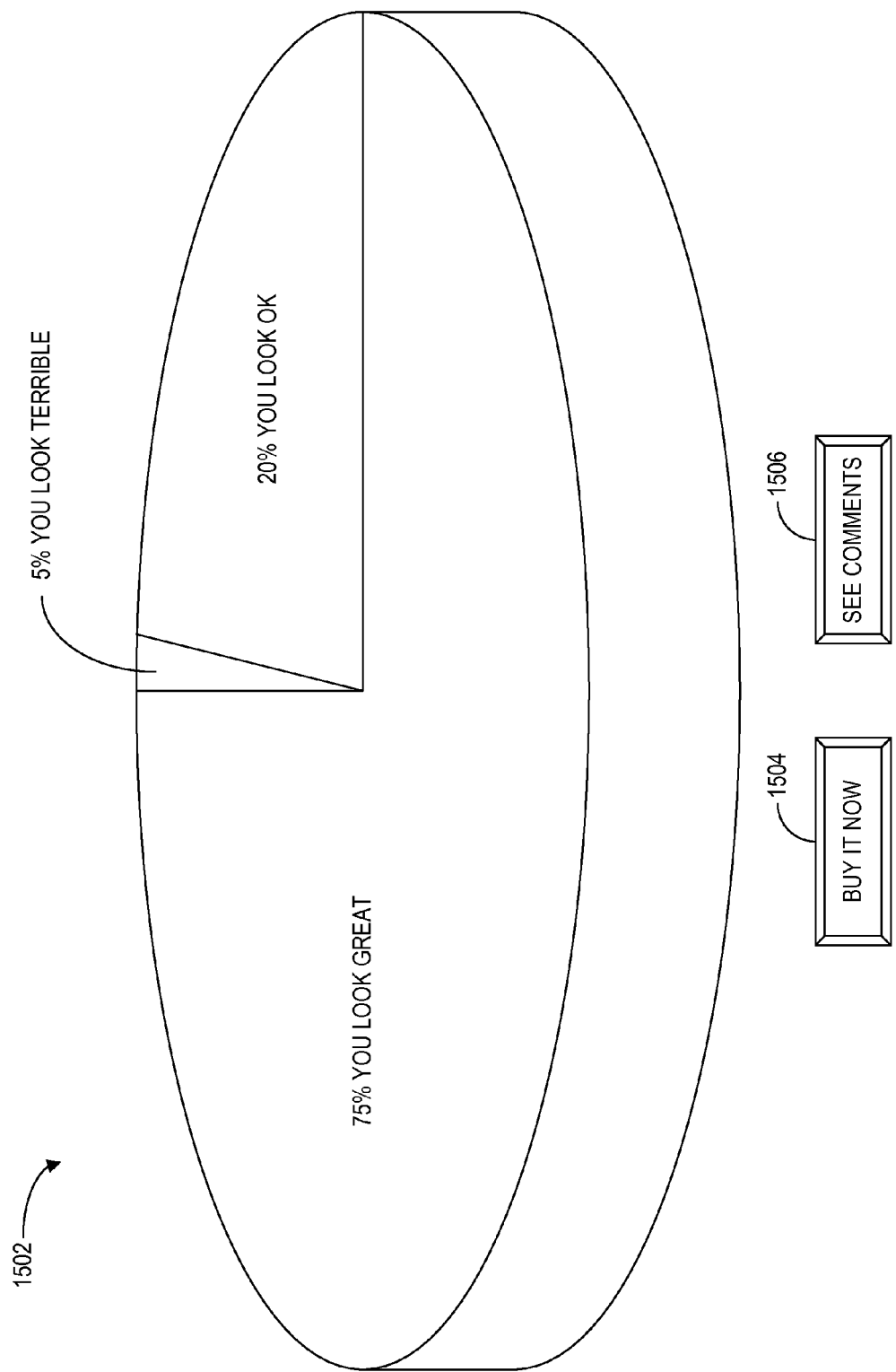
FIG. 15 shows a screen display provided according to one embodiment of the invention to a shopper to provide feedback based on responses from a panel of participants.

FIG. 15 shows one example of how the feedback may be presented to the shopper. In FIG. 15, a pie chart 1502 presents results of the statistical analysis of the responses from the participants. For the purposes of the display of FIG. 15 it has been assumed that the responses from the participants were in general very favorable, with three-quarters of the participants indicating that the shopper looked "great" in the selected garment or garments. Consequently, a button 1504 is provided in the display of FIG. 15 to allow the shopper to immediately indicate selection of the garment or garments for purchase. Actuation of the button 1504 may, for example, invoke a "one-click" purchase routine, like that described in U.S. Pat. No. 5,960,411. Alternatively, actuation of the button 1504 may add the selected garment or garments to a virtual "shopping cart". Virtual shopping carts are widely used in connection with retail shopping websites and need not be described further.

Also provided in the display of FIG. 15 is a "see comments" button 1506. Actuation of the button 1506 allows the shopper to gain access to the open-ended text comments that were entered by the participants as part of their responses. (Of course, no button 1506 is provided in cases where none of the participants provided text responses.) The comments may simply be streamed in the order in which they were received. As another alternative, a key word analysis of the comments may have been made as part of the processing of the responses carried out at step 1118 (FIG. 11). On the basis of the key word analysis, the comments may be grouped together and may be accessible via headings that correspond to keywords detected in the responses. Examples of key words that may be used to analyze text comments are "color", "pattern", or "cut". Key word analysis techniques that may be employed in analyzing the text comments are discussed in U.S. patent application Ser. No. 09/540,498, entitled "Method and Apparatus for Administering a Survey via a Computer Network", which is commonly assigned with the present application. The disclosure of the '498 application is incorporated herein by reference.

FIG. 16 is an example of another screen display that may be provided in accordance with the invention to give the shopper feedback based on the responses from the panel of participants. This screen display includes a "thumbs up" symbol 1602 to indicate that the reaction of the panel of participants to the garment in the combined image was a positive reaction. If the reaction were negative, a "thumbs down" symbol might be provided. If the responses were mixed (neither predominantly positive nor predominantly negative), a "shoulder shrug" image might be provided.

If the shopper is interested in receiving more information about the responses from the panel of participants, he or she may actuate a button 1603. In response to actuation of this button, a display like that of FIG. 15 may be provided, including a pie chart showing results of a statistical analysis of the responses. Other manners of presenting the statistical analysis may also be used, such as a bar chart, or a table showing percentages in numerical form.

The shopper can also get more information about the responses from the panel of participants by actuating a "see comments" button 1606. This button performs the same functions as the button 1506 which was discussed in connection with FIG. 15. In addition, the display of FIG. 16 includes a "Buy it now" button 1604 that corresponds to, and may provide the same functions as, the button 1504 discussed in connection with FIG. 15.

It is noted that the screen displays of FIGS. 15 and 16 have a marketing function in that the merchant server allows the shopper to initiate purchasing of the selected garment or garments by actuating buttons 1504 or 1604, as the case may be. These screen displays or similar displays may be used for other marketing purposes as well. For example, if the feedback provided by the screen display is indicative of an unfavorable reaction to the combined image, then a button or link may be included in the screen display to allow the shopper to access alternative garments that the shopper may virtually "try on" or select for purchase. Such a button may indicate, for example, "try a different color". A suggestion or alternative offer included in the feedback screen may be selected by the server based on an analysis of the responses provided by the participants.

The feedback screen may serve as a vehicle for other marketing overtures, as well. For example, if the reaction from the panel of participants is a mixed reaction, a button or display may be included in the screen of FIG. 15 to offer the shopper a discount to buy the selected garment or garments. Where the reaction is a favorable reaction, the screen display of FIG. 15 or FIG. 16 may include a portion that suggests an accessory that goes with the selected garment or garments. The suggestion to purchase the accessory may include a discount offer or a package price offer to give the shopper an incentive to purchase the accessory together with the selected garment or garments. It is also contemplated to offer a package price for the selected garment and an item other than an accessory. For example, if the selected garment is a pair of slacks, a package price may be offered for the selected garment plus a matching or coordinating blouse. U.S. patent application Ser. No. 09/360,422, entitled "Determination and Presentation of Package Pricing Offers in Response to Customer Interest in a Product", which is commonly assigned with the present application, discloses techniques for presenting package pricing in an on-line retail shopping environment. The disclosure of the '422 application is incorporated herein by reference.

It is also contemplated to incorporate marketing functions in the server's communications with participants. For example, a "buy it now" button like buttons 1504 and 1604 (FIGS. 15 and 16 respectively) may be added to the display of FIG. 14 so that the participant is allowed to initiate purchase of the garment shown in image 1402. Alternatively, a pop up message such as "Do you want to buy the garment?" may be actuated if the participant indicates a positive response to the image such as by actuating checkbox 1404 in the screen display of FIG. 14.

The on-line fashion opinion feature described herein provides benefits for the merchant, for the shopper, and for the participants.

From the point of view of the merchant, this feature provides excellent opportunities for the merchant to contribute to the shopper's decision-making process. Perhaps most important, the information generated from the responses from the participants may help overcome any anxiety or reluctance the shopper may have in regard to purchasing the selected garment or garments. Consequently, this feature may make the difference between an order received from the shopper and an order lost. Thus the on-line fashion opinion feature may serve as a marketing tool to acquire and retain customers. Moreover, the screen displays by which the server communicates with the shopper provide what may be a highly effective channel through which the merchant may offer to the shopper promotions, discounts, up sells and other marketing opportunities.

The fashion opinion feature of the present invention can also operate as an effective and low-cost market research tool. In essence, each request for participants' opinions may function as an on-line focus group concerning the garment or garments that the shopper is virtually trying on. The data representing the participants' responses is potentially very valuable, and may be analyzed by the merchant to detect fashion trends and to learn how various groups of customers or potential customers are perceiving the merchant's product offerings. This data, or information obtained by analyzing it, may also be sold to designers or other suppliers of fashion items.

Also, since demographic and other information about shoppers may also be available, it may be possible to develop additional market intelligence simply by analyzing the requests for opinions by shopper, to spot trends in terms of what items are appealing to which groups of customers.

The fashion opinion process disclosed herein also enhances the merchant's market presence vis-à-vis the participants. Preferably every time the participant is invited to respond to a request for an opinion, the merchant's name is included in the request. Thus the participant's awareness of the merchant is reinforced. Furthermore, when participants do respond, they are exposed to the item of merchandise that has been selected by the shopper, which may cause the participant to develop an interest in purchasing the item. In one embodiment, as noted above, the interaction of the merchant server with the participant may include presenting the participant with an opportunity to purchase the garment that is included in the image to which the participant is responding. Thus the participants' responses to the request for an opinion becomes selling opportunities for the merchant.

From the point of view of the shopper, this on-line opinion feature is also beneficial in a number of ways. For example, as noted above, the information received as a result of the participants' responses may help the shopper to make an informed decision and may aid the shopper in overcoming the anxiety which often accompanies a decision as to whether to purchase a garment. If the shopper is concerned as to whether the garment will prove acceptable to his or her peers, then he or she may request opinions from participants who are similar to the shopper in demographic and/or subjective characteristics. If the shopper wishes to determine whether the garment or garments will appeal to a group of people other than the shopper's peers (e.g., to determine whether the garment will appeal to members of the opposite sex) the shopper again can specify an appropriate group of participants from which opinions are to be received.

The shopper may also benefit by receiving targeted offers, such as those described above, that are relevant to the potential purchase of the garment. For example, as noted before, if the response from the participants to a particular garment is mixed, the shopper may receive an incentive to purchase the garment, notwithstanding the less than positive response from the participants. Other offers that may be provided to the shopper, as also noted above, may provide favorable deals if the selected garment or garments are purchased together with other items.

Furthermore, the fashion opinion feature may also enhance the overall on-line shopping experience. Many shoppers may find that there is substantial entertainment value simply in selecting a garment, and observing the resulting combined image when the garment is "tried on" the virtual model or other representation of the shopper. The entertainment value may be further increased by having the combined image sent to participants (perhaps a large number of participants) and then reading their comments or other responses to the combined image. It will be understood that the present invention allows each shopper to assume the role of "fashion model".

Entertainment value is also one of the benefits of the fashion opinion feature from the point of view of the participants. Participants may find it very enjoyable to observe what shoppers are considering buying and "trying on". In effect participants are permitted by the invention to be attendees at a virtual fashion show. They may also enjoy having the opportunity to express their opinion about the potential purchases. At the same time, participants have the opportunity to learn what kinds of fashions are being made available by merchants. This can give participants ideas about how the participants may wish to expand their own wardrobes.

It is also contemplated, in some embodiments, that the participants may earn favorable ratings by responding to queries, or merely by being available to respond. For participants who earn favorable ratings, merchants may provide a number of incentives, such as a preferred customer status, an opportunity to preview designer collections that are not yet available to the public, or access to merchandise that is in limited supply. The merchant may also provide discounts or other monetary benefits to highly rated participants.

It can therefore be seen that the fashion opinion feature described herein is advantageous to all involved.

Figure 17:
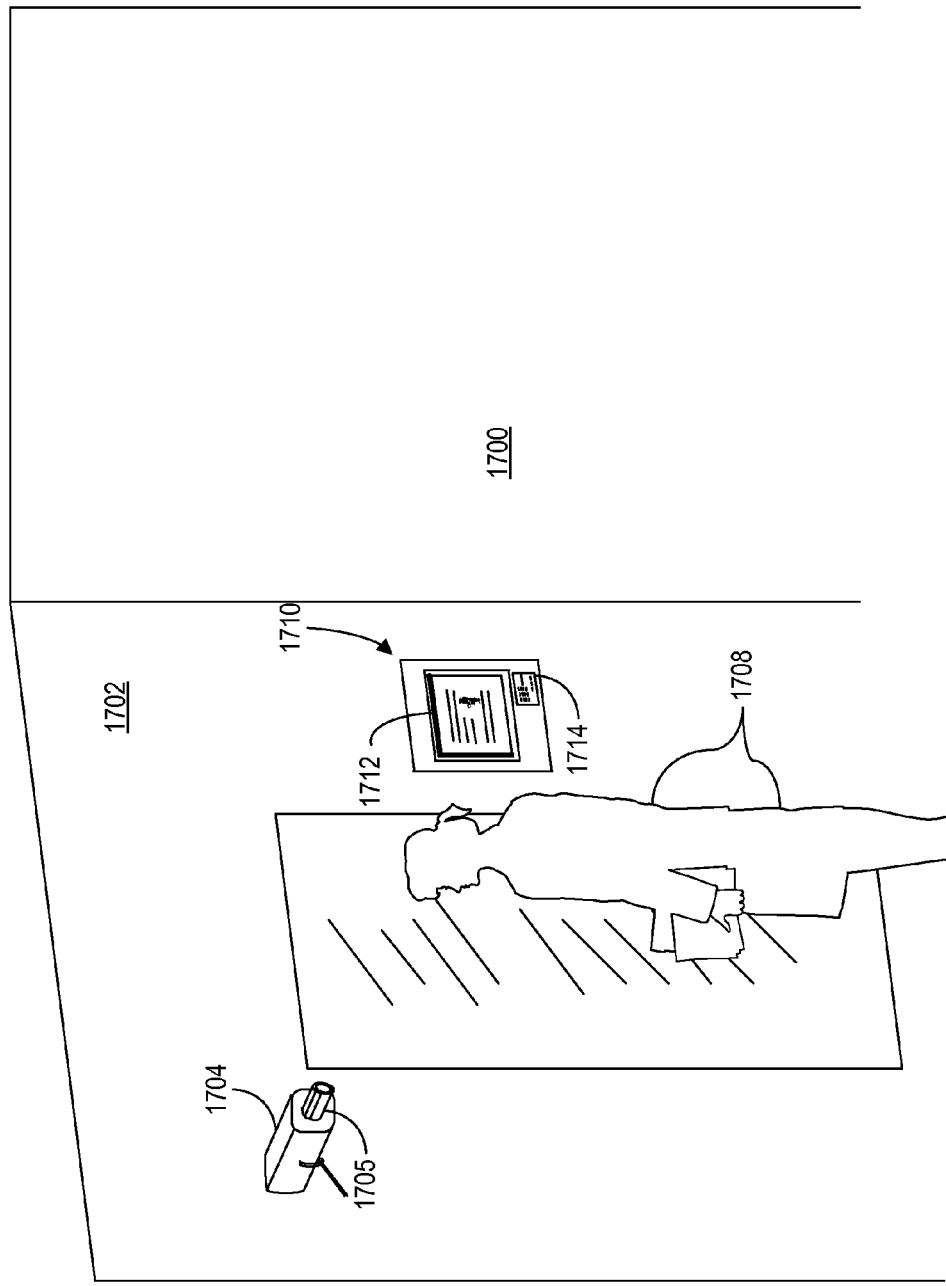
FIG. 17 is a schematic representation of a kiosk arrangement provided in accordance with an embodiment of the invention.
Figure 18:
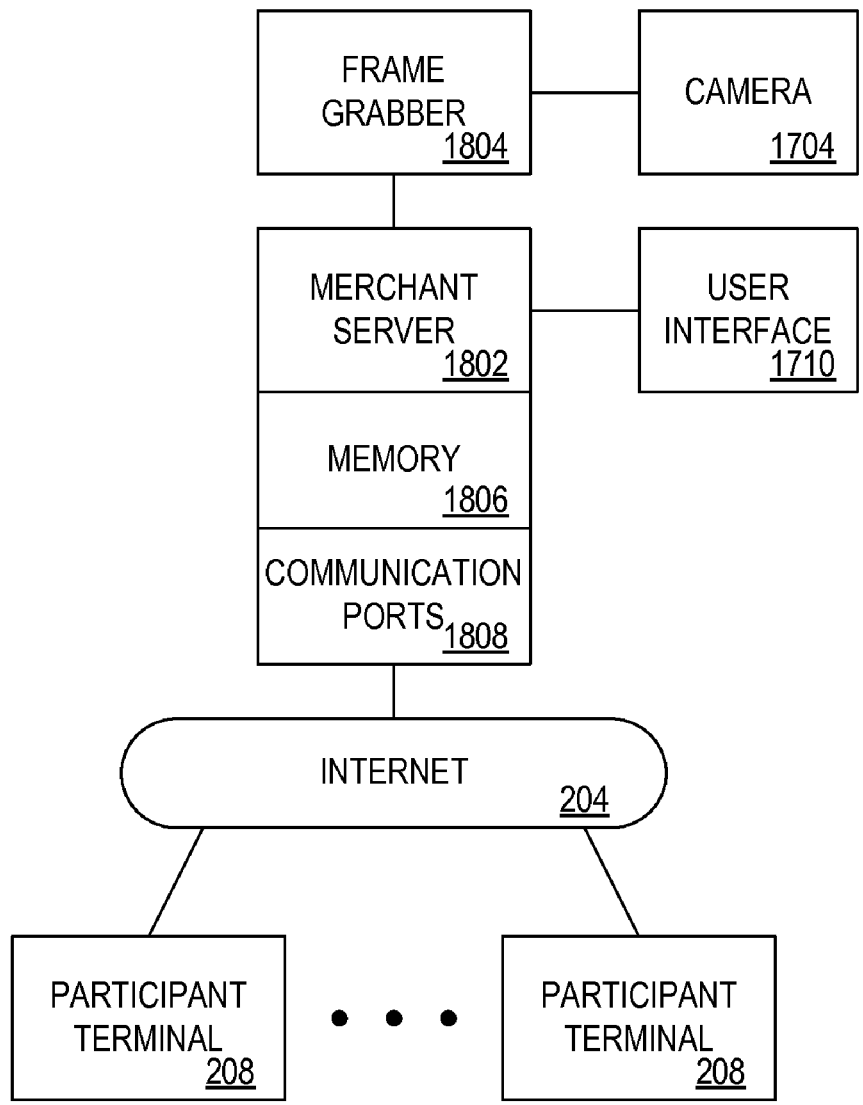
FIG. 18 is a block diagram representation of a system provided in accordance with one embodiment of the invention and including the kiosk arrangement of FIG. 17.

In addition to the on-line embodiment described above, it is also contemplated to provide an embodiment of the present invention for use by shoppers who are physically trying on clothes at a "bricks and mortar" retail store. FIGS. 17 and 18 illustrate a hardware arrangement provided to implement the present invention in an in-store environment.

FIG. 17 shows a dressing room 1700 that includes a wall 1702 on which a camera 1704 is mounted. Camera 1704 may be a conventional color video camera, and includes an optical system 1705. Alternatively, a digital camera may be employed. A shopper 1706 is standing in the field of view of the camera 1704. The shopper is wearing garments 1708. Conveniently mounted on the wall 1702 is a user interface 1710 by which the shopper 1706 may input instructions for performing the present invention. The user interface 1710 may include, for example, a touch screen 1712 and a magnetic stripe card reader 1714.

Electronic components of the system are illustrated in block diagram form in FIG. 18. In addition to the user interface 1710 and the camera 1704 discussed in connection with FIG. 17, and the Internet 204 and participant terminals 208 discussed in connection with FIG. 2, the system also includes a merchant server 1802 and a frame grabber 1804. The merchant server 1802 includes memory components 1806 and communication ports 1808. The memory components 1806 provide program, working and database storage. The communication ports 1808 provide an interface between the merchant server 1802 and the Internet 204 and participant terminals 208.

The merchant server 1802 is connected to the user interface 1710 to receive input from the shopper and to provide output to the shopper. The frame grabber 1804 is connected between the merchant server 1802 and the camera 1704. Under control of the merchant server 1802, the frame grabber 1804 captures and digitizes video signal frames provided by the camera 1704. The digitized frames are stored in the memory 1806 of the merchant server 1802.

Figure 19:
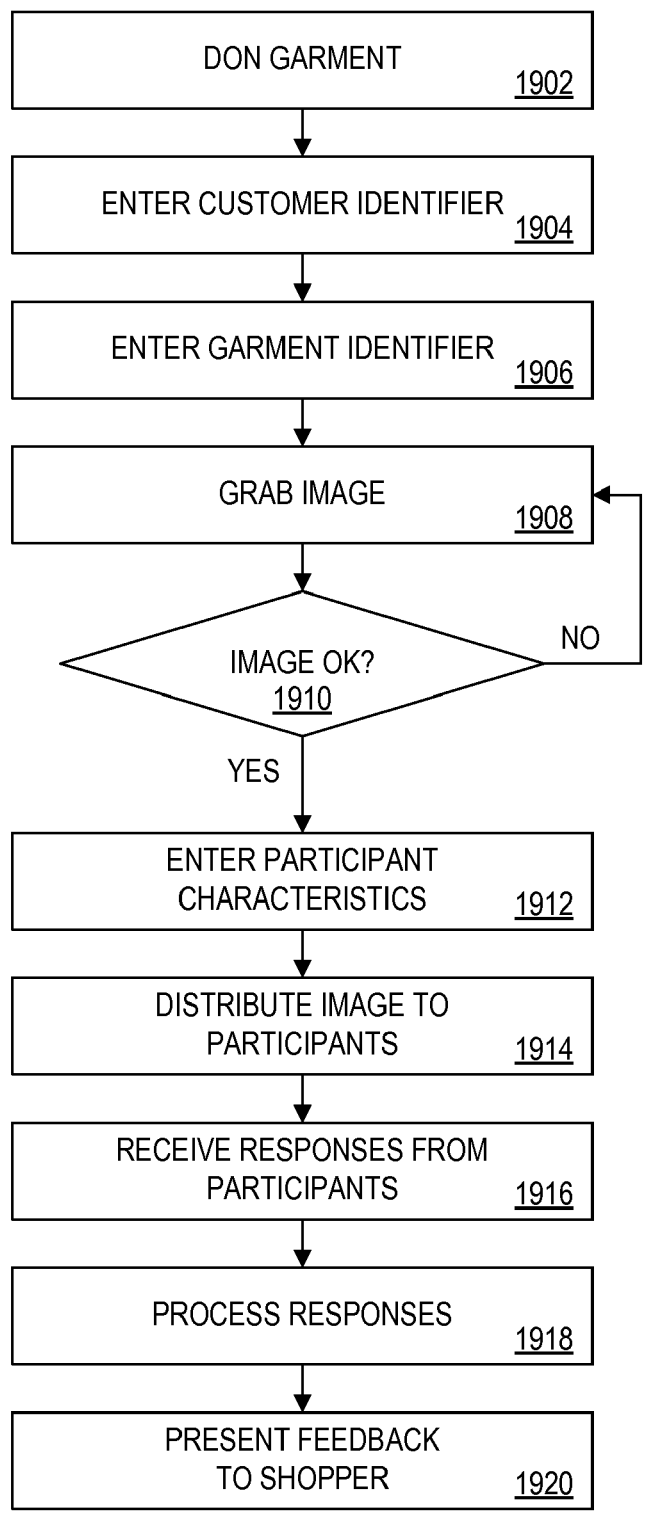
FIG. 19 is a flow chart that illustrates a method carried out using the system of FIGS. 17 and 18 according to an embodiment of the invention.

FIG. 19 is a flow chart that illustrates operation of the system of FIGS. 17 and 18. At step 1902, the shopper dons the garment or garments in regard to which he or she desires to receive opinions from a panel of participants. At step 1904 the shopper enters his or her customer identifier into the system. This may be done by entering numerical data via the touch screen 1712. Alternatively, a shopper identification card or the shopper's credit card may be read by the card reader 1714. As another alternative the shopper may enter his or her name via the touch screen.

At step 1906 the shopper enters into the system an identification code that identifies the garment that he or she is trying on. This code may also be entered via the touch screen 1712. As an alternative, the user interface 1710 may include a bar code scanner that the shopper may use to scan a bar code on a price tag that has been affixed to the garment.

It will be recognized that the order in which steps 1902, 1904 and 1906 are performed is not critical. However, it may be more efficient for the shopper to don the garment before entering the information referred to in connection with steps 1904 and 1906.

After donning the garment, and either before or after entering the information referred to in connection with steps 1904 and 1906, the shopper uses the user interface 1710 to signal the system to capture an image of the shopper while wearing the garment. This step is represented at 1908 in FIG. 19. Preferably, the capturing of the shopper's image is delayed by a certain period, say five seconds, after he or she signals for the image to be captured. This allows the shopper enough time to assume an appropriate pose for the image to be captured.

It is preferred that the shopper's image as captured by the system via the camera 1704 be displayed on the touch screen 1712 for review and approval by the shopper. Decision block 1910 represents a determination by the shopper as to whether the image is acceptable. If not, the shopper may again signal the system to capture another image of the shopper.

Step 1912 represents the shopper entering his or her selection of desired characteristics for the panel of participants who will provide their opinion on the garment. It is to be noted that step 1912 may be performed prior to some or all of steps 1902 through 1910. Step 1912 may be like step 1112 of FIG. 11, and may use an interface screen like that of FIG. 12. However, the display of FIG. 12 may be adapted for ease of use with a touch screen interface. It may also be desirable to simplify the screen display of FIG. 12, since the shopper may not wish to spend as much time at the interface 1710 as he or she may be willing to spend when entering information via his or her own computer terminal as in the on-line embodiment described above.

Following step 1912 in FIG. 19 are steps 1914, 1916, 1918 and 1920, which may generally correspond to steps 1114-1120 of FIG. 11. It will be understood that features of the process of FIG. 11 that are only applicable to on-line shopping would not be included in the process of FIG. 19. However, the user interface 1710 may be used by the system for in-store promotions, and for any other purpose that an in-store kiosk may be put to. For example, since the system knows what garment or garments the shopper is trying on, the system may also suggest to the shopper accessories and/or matching or coordinating garments to purchase in addition to the garment being tried on. In addition, when the feedback from the participants is unfavorable or mixed, the system may suggest alternative garments for the shopper to try on. The system may include a function to permit the shopper to summon a member of the store's sales staff to help the shopper, for example, to locate an alternative garment, an accessory, or a matching or complementary garment, that has been recommended by the system. With the addition of a receipt printer, the arrangement of FIG. 17 may operate as a self-checkout station.

Advantages offered by the embodiment of FIGS. 17-19 are similar to those of the previous embodiment. As before, this embodiment allows a retailer to provide an additional service to the shopper, including opportunities for marketing both to the shopper and to the participants.

For the shopper, the availability of opinions from third parties may help the shopper overcome any anxiety or hesitation in regard to the purchase, and may generally make the shopping experience more enjoyable. The benefits for participants are much the same as in the on-line embodiment described above.

In the embodiments discussed above, the fashion opinion system may be administered either by a merchant's on-line shopping website server or by a server that may be installed in the merchant's store. However, alternative configurations are contemplated. For example, the fashion opinion system may be administered by a service bureau that is under contract with the merchant and that may provide similar services for other merchants. Information gathered by the service bureau server regarding requests for opinions and responses may be transmitted to merchants' computers.

In the embodiments described above, the participants' involvement ends when they have provided their responses to the shopper's query. However, it is contemplated to modify these embodiments such that shoppers are permitted, or the system is arranged, to ask follow-up questions of the participants and the participants are allowed to respond. For example, either the system itself or a shopper may inquire of participants who gave negative opinions whether their opinion related to the garment itself or simply how the garment looked on the shopper.

It is also contemplated to permit shoppers to engage in on-line chat with a selected one or ones of the participants to follow up on comments that the participants made, or simply to ask participants to provide more information. As an example, if only one participant in a panel gave a negative opinion, the shopper may wish to follow up with the participant to find out what the participant did not like about the image that was sent to the participant.

Although it may be preferable to report the participants' opinions exactly as received, it is also contemplated to allow an interested third party to skew the reported results. For example, a parental override could be implemented by allowing parents to indicate to a system that any time a child tries on clothing that the parent considers unsuitable, a negative result will be reported. The results could also be skewed at the request of a third party, in a positive direction, so that the third party encourages the shopper, in effect, to purchase clothes that the third party approves of. It is contemplated that the third party may be charged a fee by the system for the privilege of skewing the results.

In the embodiment of the invention illustrated in FIGS. 17-19, the user interface is configured as a kiosk embedded in a wall of a dressing room, with the wall of the dressing room serving as a kiosk structure. As an alternative, it is contemplated to mount the camera and the user interface in a stand-alone kiosk structure. As still another alternative, a camera and user interface may be implemented as a compact, portable, personal digital assistant (PDA) in wireless communication with the merchant server 1802 (FIG. 18).

Figure 20:
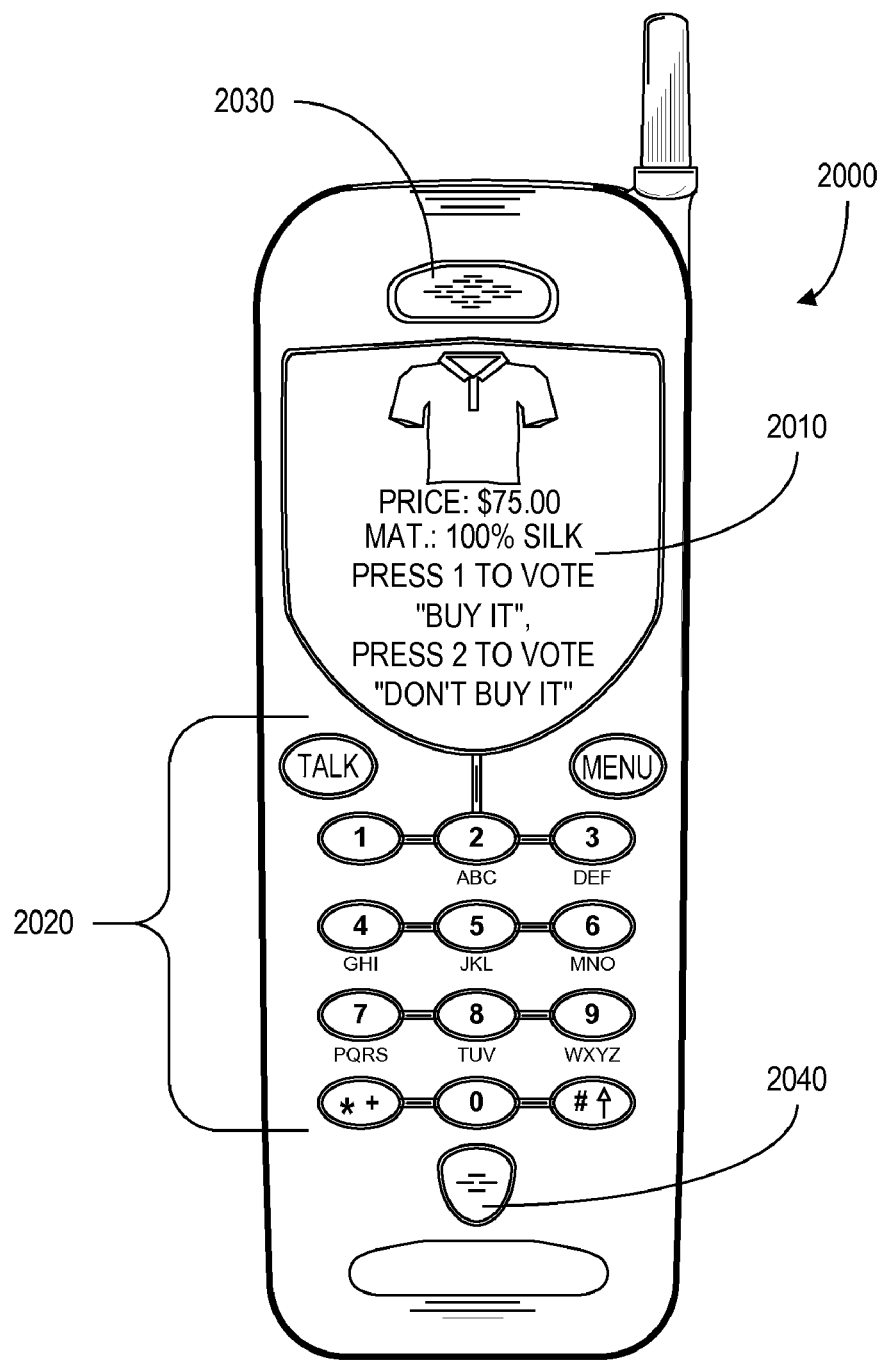
FIG. 20 is a plan diagram of a cellular telephone of a participant, displaying a request for an opinion regarding a garment, in accordance with one embodiment of the invention.

Referring now to FIG. 20, a plan diagram of a cellular telephone 2000 is illustrated. Cellular telephone 2000 may comprise a participant terminal 208, in accordance with one embodiment of the present invention. The cellular telephone 2000 may be, for example, programmed to operate on a 3G network. The cellular telephone 2000 may be operable to receive and display images (e.g., images of garments, images of a shopper wearing a garment, and/or images of a virtual model of a shopper combined with an image of a garment). Thus, when a shopper submits a request for opinions regarding a garment, an image of the garment along with a query may be transmitted to the cellular telephone of each participant selected for the panel that is to provide an opinion to the shopper.

Cellular telephone 2000 includes a display screen 2010 and a keypad area 2020. The display screen 2010 is displaying an image of a garment, additional information about the garment (price and material) and a request for an opinion regarding the garment. The request for an opinion instructs the participant to vote either that the shopper should buy the garment or not buy the garment. The participant may respond to the request for the opinion by pressing the appropriate keys on the keypad 2020, as instructed in the request for the opinion (i.e., by pressing "1" to vote that the shopper should buy the garment and pressing "2" to vote that the shopper should not buy the garment).

Cellular telephone 2000 also includes a speaker 2030 and a microphone 2040. In one or more embodiments, the speaker 2030 may be utilized to transmit a request for an opinion to a participant. For example, a computerized message or human operator may output the request for the opinion to the participant (e.g., by telling the participant to press "1" to vote that the shopper should buy the garment or press "2" to vote that the shopper should not buy the garment). In one or more embodiments, a participant may be allowed to provide an opinion and thus respond to a request for an opinion utilizing microphone 2040. For example, the participant may speak the words "Buy It" or "Don't Buy It" or another choice of words conveying the participant's response to the request for the opinion into the speaker 2040. A voice recognition module of the merchant server 202 or another computing device operating to facilitate embodiments of the invention may determine the participant's response by analyzing the participant's spoken words and converting them to text.

Figure 21:
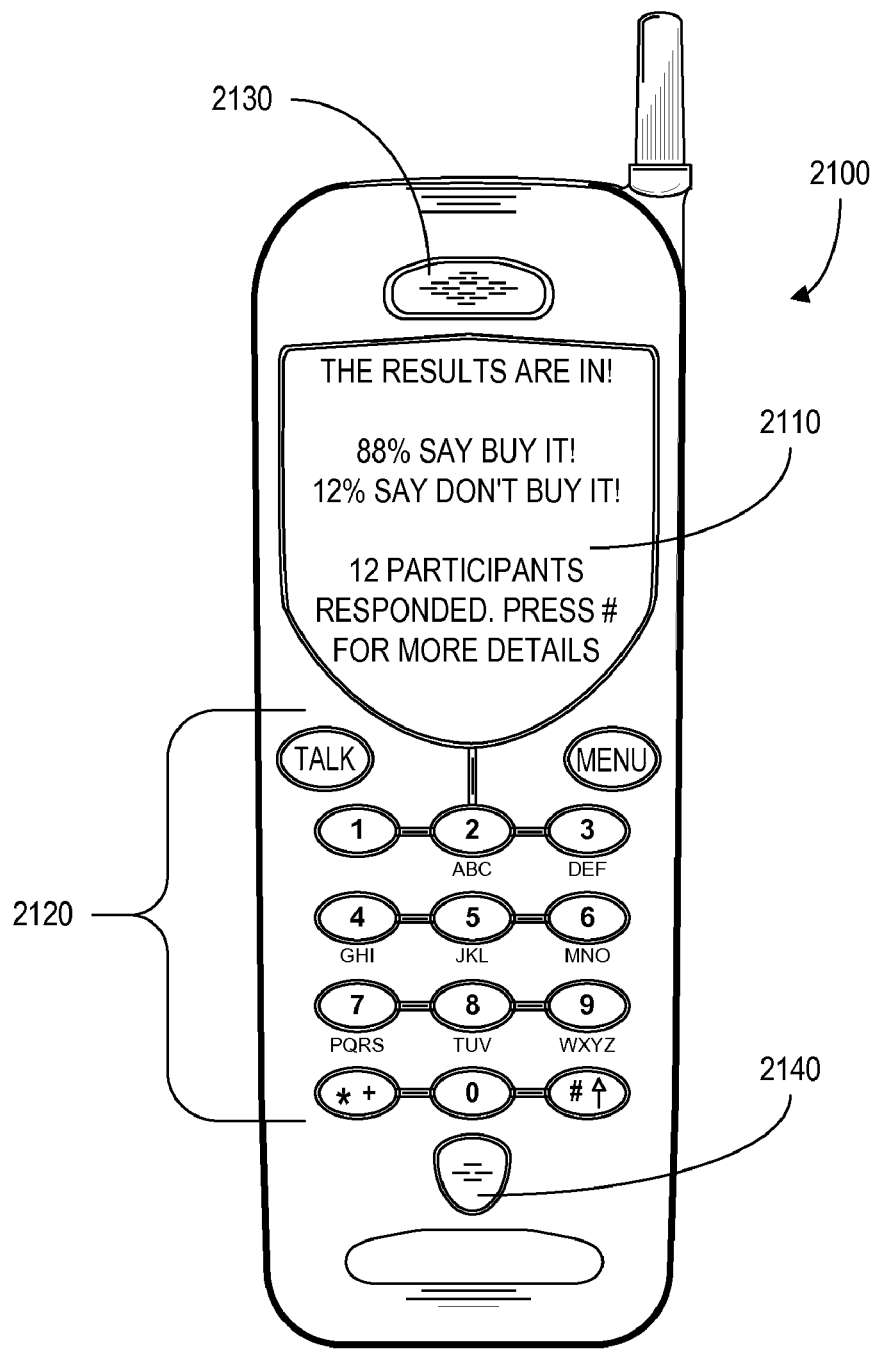
FIG. 21 is a plan diagram of a cellular telephone of a shopper, displaying results of a request for an opinion regarding a garment, in accordance with one embodiment of the invention.

Referring now to FIG. 21, a plan diagram of a cellular telephone 2100 is illustrated. Cellular telephone 2100 may comprise a shopper terminal 206, in accordance with one embodiment of the present invention. The cellular telephone 2100, like cellular telephone 2000, may be, for example, programmed to operate on a 3G network. The cellular telephone 2100 may be operable to receive and display indications of responses to requests for opinions.

Cellular telephone 2100 includes a display screen 2110 and a keypad area 2120. The display screen 2110 is displaying an indication of results of a request for opinions. Additionally, the display screen is displaying instructions to the shopper for obtaining further details regarding the results. For example, by pressing "#", the shopper may be presented with additional details of one or more responses (e.g., the full text of one or more responses) or may be connected to a human operator who may answer any questions the shopper may have about the results. The shopper may use keypad area 2120 to obtain the additional details, per the instructions.

The cellular telephone 2100 includes a speaker 2130 and a microphone 2140. In one or more embodiments, the shopper may utilize the speaker 2130 and/or the microphone 2140 to communicate with the merchant server or other computing device or entity facilitating aspects of the present invention. For example, the results of the request for opinions may be output to the shopper via speaker 2130. In another example, the shopper may request additional details regarding the results by speaking into the microphone 2140 or may communicate with a human operator regarding the additional details of the results using the microphone 2140.

It should be noted that the display area 2010 of cellular telephone 2000 and the display area 2110 of cellular telephone 2100 may be color displays operable to display detailed graphical images to the participant and shopper, respectively. For example, the display areas 2010 and 2110 may comprise color Liquid Crystal Displays (LCDs).

It should further be noted that, in one or more embodiments, the cellular telephone 2100 of the shopper may include an image capturing peripheral, such as a digital camera. The shopper may use the image capturing peripheral to capture an image of a garment and/or an image of the shopper wearing the garment, for output to the one or more participants to whom the request for opinions is to be output.

It was described above that a rating system may be employed for participants. The purpose of such a system may be to encourage participants to take part in the system and to participate conscientiously and effectively. For example, if a participant provides a particularly insightful and lengthy response, the shopper may indicate that the participant should receive an enhanced rating. Alternatively, the system may automatically provide ratings for participants based on availability, participation and/or length of responses. As noted above, participants may receive benefits from a system administrator or from the retailer when participants achieve a certain rating level. It is expected that good will of participants and a participant rating system, if implemented, will suffice to produce honest responses from participants. However, if certain participants appear to be providing only negative opinions for the purpose of annoying shoppers, the merchant may choose to screen out such participants.

Shoppers may be given the option only to receive responses from participants who have relatively high ratings. The system may provide that participants who have not participated (i.e., new participants), may have a default rating at a low level. Participants may also be rated based on their history as customers of a retailer. That is, participants who have bought a considerable amount of merchandise from a merchant may be accorded an enhanced rating because the participant's purchases.

The present invention has been discussed in connection with trying on garments, but is also applicable to items such as cosmetics, eyeglasses, hairstyles and plastic surgery. Of course, plastic surgery cannot be "tried on", but an image or virtual image of the shopper (prospective patient) can be manipulated to indicate how the shopper will appear after the surgery has been performed.

It was noted above that merchants may be enabled to suggest alternative or complementary items relative to garments that the shopper is trying on or virtually trying on. It is contemplated that this marketing channel may be made available by the retailer to clothing manufacturers or designers, for a fee.

It is also contemplated that participants may take part in a purchase transaction involving a selected garment. For example, if a participant is a relative, friend or acquaintance of the shopper, the participant may be given the option of subsidizing the purchase or of purchasing the garment as a gift for the shopper. Alternatively, a participant may be a representative of another merchant who makes a cross-subsidy offer to the shopper in connection with the purchase of the garment.

Where the shopper image is a virtual model, the system may recommend to the shopper a garment or garments that was favorably reviewed for another shopper or shoppers having a similar body type.

The present invention may include a number of features to enhance the entertainment value of the system from the point of view of the participants.

According to one such feature, when participants are invited to join a panel, they are informed of demographic or other characteristics of the shopper, and make a decision on whether to participate based on the shopper's characteristics. In another embodiment, participants are given the option of requesting information about the shopper.

According to another feature, participants are permitted to view shopper/garment combined images, and possibly also to provide responses, even when the participants do not match the participant characteristics selected by the shopper. In such cases, the non-matching participants' responses may not be used to generate the feedback for the shopper. The participants may be allowed to search for shopper/garment images to view based on shopper characteristics, after logging on to a suitable website. Also, or alternatively, shoppers may be rated based on responses from the participants and participants may search for shoppers to view based on ratings categories such as "top ten shoppers", "worst ten shoppers", "most improved shopper". Participants and/or shoppers may also be allowed to view lists of garments included in highly rated shopper/garment images.

It is also contemplated that shoppers may be permitted to define a diverse panel of participants while receiving feedback that is divided by categories of participants.

In one or more embodiments, participants may be compensated for providing opinions to shoppers. For example, participants may be provided with a benefit in exchange for each opinion provided or in exchange for every predetermined number of opinions provided. Examples of benefits that may be provided include, but are not limited to, monetary fees, entries into sweepstakes or lotteries, discounts on merchandise or services, or access to the present system for purposes of requesting opinions from other participants. In the latter example, the participant who receives this benefit becomes a shopper when requesting an opinion.

In one or more embodiments, steps may be taken to maintain the anonymity of a shopper who requests an opinion regarding a garment. For example, if an image of a shopper is transmitted along with the request for an opinion, the face of the shopper may be blurred, removed or replaced in the image. In an example where only the image of the garment is transmitted, the request for an opinion that is transmitted to a participant may not include any information identifying the shopper who requested the opinion (e.g., the shopper's name or other identifying information may not be transmitted).

It should be understood that, in accordance with one or more embodiments of the present invention, a shopper is provided with the results of a request for opinions within a very short time of submitting such a request. For example, a shopper may be provided with the results within a one or a few minutes of submitting the request. In order to accomplish this, the selection of participants for a panel and the output of the image and/or request for opinions to participants may be performed substantially immediately upon receiving the request for opinions from the shopper. Further, the participants may be provided with a maximum period of time within which to respond to a request for an opinion. For example, a participant may be provided with a maximum period of time of one to ten minutes within which to respond to an opinion. In such an embodiment, the system may wait for responses to be received from participants for the maximum period of time and then determine the results of the query (e.g., determine the indication to output to the shopper, such as percentage of participants who voted "Buy It" versus the percentage of participants who voted "Don't Buy It") at the end of the period of time, regardless of whether all participants have responded.

In one embodiment the period of time for accumulating responses may be set such that the process of collecting opinions and outputting the indication of the results of the request for opinions is performed within a short period of time. The short period of time may be measured from a time at which the request is received from the shopper. The short period of time may be such that it allows the shopper to make a decision regarding the desirability of the garment based on the indication of the opinions while a shopper is conducting a shopping session during which the shopper submitted the request for opinions. For example, it may determined that it is reasonable for a shopper to wait five minutes for the results of the request for opinions from the time the shopper submits the request for opinions. For example, it may be determined that the shopper is likely to continue browsing or trying on garments at the merchant for such a period of time. In another example, it may be determined that it is reasonable for a shopper to only wait one minute or as long as one hour for the results of the request for opinions.

In one embodiment, a shopper when submitting a request for opinions (or at another time, such as when signing up for a subscription to the service in accordance with the present invention) may indicate the duration of time the shopper is willing to wait for the results of a request for opinions.

In another embodiment, a minimum number of responses may be associated with a request for opinions. In such an embodiment, the process of accumulating responses may end when the minimum number of responses are received, even if the maximum period of time for accumulating responses has not ended. Alternatively, the responses may continue to be accumulated until the end of the maximum period of time. In one embodiment, if at the end of the maximum period of time a minimum number of responses have not been received, the shopper may be provided with a message indicating that the request for opinions did not yield a sufficient number of opinions. In one embodiment, the shopper may be provided an opportunity (either when first submitting a request for opinions or upon receiving an indication that a minimum number of opinions were not received) to request that the results of the request for opinions be provided to the shopper despite the minimum number of opinions not being received.

Although the present invention has been described with respect to preferred embodiments thereof, those skilled in the art will note that various substitutions, modifications and variations may be made with respect to the embodiments described herein without departing from the spirit and scope of the present invention.

What is claimed is:

1. A computer readable memory storing instructions configured to direct a computing device to perform:
receiving, from a mobile device associated with a shopper, a request for opinions regarding an image of the shopper's appearance, the request including a period of time during which to collect responses from one or more peers;
determining the image of the shopper's appearance, the image showing how the shopper's appearance is changed by a product or changed after a service has been performed, based on information transmitted by the mobile device;
selecting the one or more peers from whom to obtain the opinions, each peer in the one or more peers being selected based on a characteristic associated with the shopper;
outputting to each of the of one or more peers the request for opinions and the image of the shopper's appearance;
receiving responses to the request from one or more participants, each response comprising an opinion of the respective participant, the one or more participants comprising at least a subset of the one or more peers;
determining that the period of time during which to collect responses has ended;
processing the received responses into categories; and
outputting, to the mobile device, an indication of the opinions of the one or more participants regarding the shopper's appearance, the indication comprising the categories, and the opinions being determined based on the received responses.

2. The computer readable memory of claim 1, wherein the outputting of the indication is performed within such a short period of time from a time at which the request is received from the shopper that it allows the shopper to make a decision regarding the desirability of the product or service based on the indication of the opinions while a shopper is conducting a shopping session during which the shopper submitted the request for opinions.

3. The computer readable memory of claim 1, wherein determining, using a mobile device, an image of the shopper's appearance, the image showing how the shopper's appearance is changed by a product, comprises:
receiving, from the shopper, an image of the product taken using a camera of the mobile device.

4. The computer readable memory of claim 1, wherein determining, using a mobile device, an image of the shopper's appearance, the image showing how the shopper's appearance is changed by a product, comprises:
 receiving, from the mobile device, an identifier associated with the product; and
 retrieving an image of the product based on the identifier.

5. The computer readable memory of claim 1, wherein the characteristic associated with the shopper comprises a characteristic possessed by the shopper.

6. The computer readable memory of claim 1, wherein the characteristic associated with the shopper comprises a characteristic the shopper desires at least one peer to possess.

7. The computer readable memory of claim 1, wherein the characteristic associated with the shopper comprises a characteristic the shopper desires at least one participant to possess.

8. The computer readable memory of claim 1, wherein the characteristic associated with the shopper comprises a geographic characteristic of the shopper.

9. The computer readable memory of claim 1, wherein the image of the shopper's appearance comprises an image of the shopper wearing the product.

10. The computer readable memory of claim 1, wherein the image of the shopper's appearance comprises an image of a virtual model of the shopper merged with an image of the product.

11. The computer readable memory of claim 1, wherein an identity of the shopper is not revealed to the one or more participants.

12. The computer readable memory of claim 1, wherein the request for an opinion comprises a query as to whether the shopper should purchase the product.

13. The computer readable memory of claim 1, wherein the shopper specifies a minimum number of peers to whom the image of the shopper's appearance is to be output.

14. The computer readable memory of claim 1, wherein the shopper specifies a minimum number of responses that are to be collected before the indication of the responses is output to the shopper.

15. The computer readable memory of claim 1, wherein each response comprises a positive response or a negative response.

16. The computer readable memory of claim 15, wherein at least one response further comprises an explanation associated with the at least one response.

17. The computer readable memory of claim 16, further comprising:
 providing to the shopper the explanation associated with the at least one response.

18. An apparatus comprising:
 a processor; and
 a storage device in communication with the processor, the storage device storing instructions configured to direct the processor to:
  receive a request for opinions regarding a an image of the shopper's appearance, the request including a period of time during which to collect responses from one or more peers;
  determine the image of the shopper's appearance, the image showing how the shopper's appearance is changed by a product or changed after a service has been performed, based on information transmitted by the mobile device;
  select the one or more peers from whom to obtain the opinions, each peer in the one or more peers being selected based on a characteristic associated with the shopper;
  output to each of the one or more peers the request for the opinion and the image of the shopper's appearance;
  receive responses to the request from one or more participants, each response comprising an opinion of the respective participant, the one or more participants comprising at least a subset of the one or more peers;
  determine that the period of time during which to collect responses has ended;
  process the received responses into categories; and
  output an indication of the opinions of the one or more participants regarding the shopper's appearance, the indication comprising the categories, and the opinions being determined based on the received responses.

19. A method comprising:
 receiving, from a mobile device associated with a shopper, a request for opinions regarding a shopper's appearance, the request including a period of time during which to collect responses from one or more peers;
 determining the image of the shopper's appearance, the image showing how the shopper's appearance is changed by a product or changed after a service has been performed, based on information transmitted by the mobile device;
 selecting the one or more peers from whom to obtain the opinions, each peer in the one or more peers being selected based on a characteristic associated with the shopper;
 outputting to each of the one or more peers the request for opinions and the image of the shopper's appearance;
 receiving responses to the request from one or more participants, each response comprising an opinion of the respective participant, the one or more participants comprising at least a subset of the one or more peers;
 determining that the period of time during which to collect responses has ended;
 processing the received responses into categories; and
 outputting, to the mobile device, an indication of the opinions of the one or more participants regarding the shopper's appearance, the indication comprising the categories, and the opinions being determined based on the received responses.

20. The computer readable memory of claim 1, wherein determining, using a mobile device, an image of the shopper's appearance, the image showing how the shopper's appearance is changed after a service has been performed, comprises:
 modifying an image of the shopper, the image comprising an electronic photo image of the shopper, a virtual model of the shopper, or any combination thereof.

* * * * *